US008542282B2

(12) United States Patent
Iwata

(10) Patent No.: US 8,542,282 B2
(45) Date of Patent: Sep. 24, 2013

(54) VIBRATION CORRECTION CONTROL CIRCUIT FOR CORRECTING DISPLACEMENT OF AN OPTICAL AXIS DUE TO VIBRATION INCLUDING CAMERA SHAKE AND IMAGE PICKUP APPARATUS EQUIPPED THEREWITH

(75) Inventor: Naoto Iwata, Nagoya (JP)

(73) Assignee: Semiconductor Componets Industries, LLC, Phoenix, AZ (US)

( * ) Notice: Subject to any disclaimer, the term of this patent is extended or adjusted under 35 U.S.C. 154(b) by 447 days.

(21) Appl. No.: 12/936,106

(22) PCT Filed: Apr. 16, 2009

(86) PCT No.: PCT/JP2009/057678
§ 371 (c)(1),
(2), (4) Date: Dec. 29, 2010

(87) PCT Pub. No.: WO2009/131056
PCT Pub. Date: Oct. 29, 2009

(65) Prior Publication Data
US 2011/0102611 A1 May 5, 2011

(30) Foreign Application Priority Data
Apr. 25, 2008 (JP) .................................. 2008-116409

(51) Int. Cl.
H04N 5/228 (2006.01)
(52) U.S. Cl.
USPC .................... 348/208.4; 348/208.3; 396/52
(58) Field of Classification Search
USPC ................. 348/208.1–208.16; 396/52–55
See application file for complete search history.

(56) References Cited

U.S. PATENT DOCUMENTS

| 6,128,442 | A | 10/2000 | Enomoto | |
|---|---|---|---|---|
| 6,414,715 | B1 | 7/2002 | Sato | |
| 2006/0104620 | A1* | 5/2006 | Ebato | 396/55 |
| 2007/0009242 | A1* | 1/2007 | Okada | 396/52 |
| 2007/0166021 | A1* | 7/2007 | Yamazaki | 396/55 |
| 2007/0183762 | A1 | 8/2007 | Washisu | |

FOREIGN PATENT DOCUMENTS

| JP | 6-261241 | 9/1994 |
|---|---|---|
| JP | 10-282536 | 10/1998 |
| JP | 2000-056350 | 2/2000 |
| JP | 2007-189478 | 7/2007 |
| JP | 2007-212556 | 8/2007 |
| JP | 2007-324929 | 12/2007 |

OTHER PUBLICATIONS

International Search Report, with English Translation, issued in International Patent Application No. PCT/JP2009/057678, mailed Jul. 28, 2009.
International Preliminary Examination Report on Patentability, with English Translation, issued in International Application No. PCT/JP2009/057678, mailed on Nov. 4, 2010.

* cited by examiner

Primary Examiner — Nelson D. Hernández Hernández
(74) Attorney, Agent, or Firm — McDermott Will & Emery LLP

(57) ABSTRACT

An integration circuit integrates an angular velocity signal outputted from a vibration detection element and generates a shift amount signal indicating the shift amount of an imaging device. The integration circuit is formed by a digital filter, which includes a register for holding an accumulation value serving as a shift amount signal. A control unit acquires an accumulation values held in the register at a predetermined interval and obtains a change amount between the accumulation value previously obtained and the accumulation value currently obtained. When the change value exceeds a predetermined threshold value, the control unit subtracts a correction value from the currently obtained accumulation value so that the value approaches zero and resets the obtained value in the register.

7 Claims, 19 Drawing Sheets

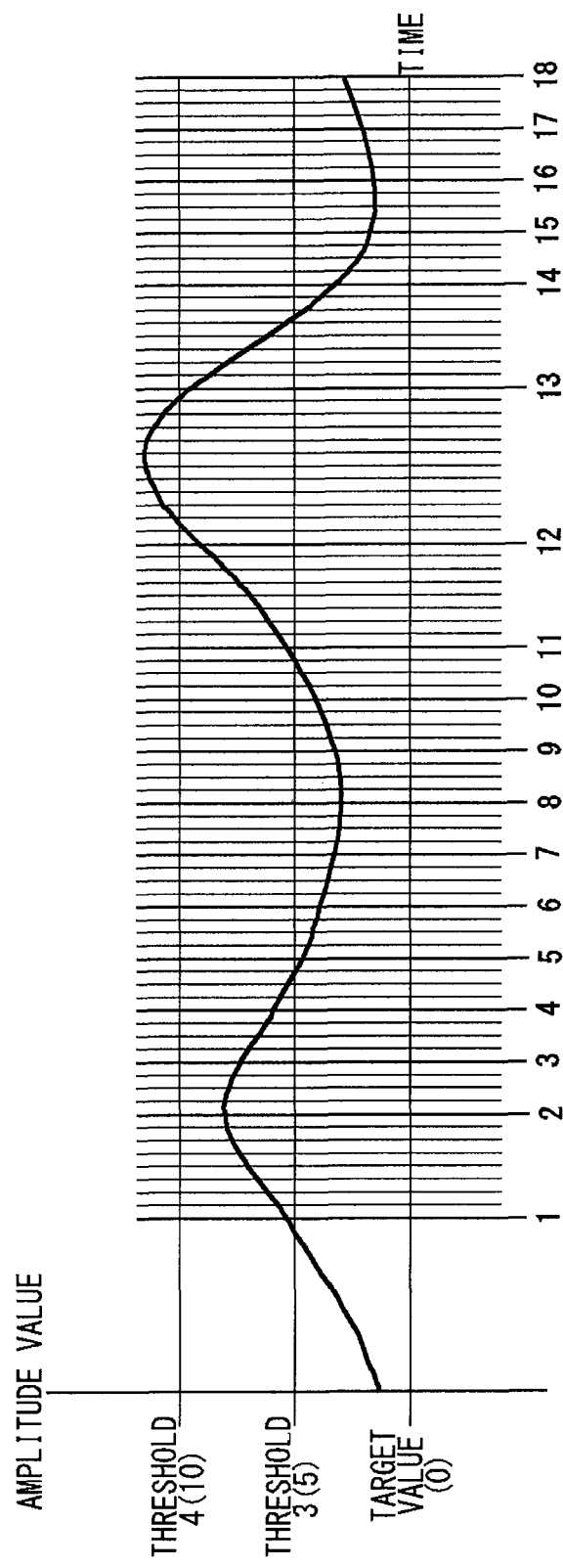

FIG.11A

| PERIOD BEGINNING | DATA ACQUISI-TION | VALUE | PERIOD TOTAL | SAMPLING AVERAGE VALUE USED FOR DETERMINATION |
|---|---|---|---|---|
| 1 | 1 | 5.3 | | |
| | 2 | 5.8 | | |
| | 3 | 6.2 | | |
| | 4 | 6.6 | | |
| | 5 | 7 | | |
| | 6 | 7.5 | | |
| | 7 | 7.8 | | |
| | 8 | 7.9 | 54.1 | 6.7625 |
| 2 | 1 | 8.1 | | |
| | 2 | 8 | | |
| | 3 | 7.9 | | |
| | 4 | 7.7 | 58.75 | 7.34375 |
| 3 | 1 | 7.5 | | |
| | 2 | 7 | | |
| | 3 | 6.5 | | |
| | 4 | 6.3 | 58.775 | 7.096875 |
| 4 | 1 | 6 | | |
| | 2 | 5.6 | | |
| | 3 | 5.3 | | |
| | 4 | 5 | 50.2875 | 6.2858375 |
| 5 | 1 | 4.7 | | |
| | 2 | 4.5 | | |
| | 3 | 4.2 | | |
| | 4 | 4 | 42.54375 | 6.31796876 |
| 6 | 1 | 3.9 | | |
| | 2 | 3.8 | | |
| | 3 | 3.6 | | |
| | 4 | 3.5 | 36.071975 | 4.50888438 |
| 7 | 1 | 3.2 | | |
| | 2 | 3.1 | | |
| | 3 | 3 | | |
| | 4 | 3 | | |
| 8 | 1 | 3 | | |
| | 2 | 3 | | |
| | 3 | 3.1 | | |
| | 4 | 3.2 | | |
| 9 | 1 | 3.2 | | |
| | 2 | 3.5 | | |

FIG.11B

| | | | | | |
|---|---|---|---|---|---|
| | | 3 | 3.7 | | |
| | | 4 | 3.9 | | |
| 10 | | 1 | 4 | | |
| | | 2 | 4.3 | | |
| | | 3 | 4.6 | | |
| | | 4 | 5 | | |
| 11 | | 1 | 5.2 | | |
| | | 2 | 5.7 | | |
| | | 3 | 6.1 | | |
| | | 4 | 6.6 | | |
| | | 5 | 7 | | |
| | | 6 | 7.5 | | |
| | | 7 | 8 | | |
| | | 8 | 8.6 | 54.7 | 8.8375 |
| 12 | | 1 | 9.1 | | |
| | | 2 | 9.8 | | |
| | | 3 | 10.2 | | |
| 13 | | 1 | 9 | | |
| | | 2 | 8.2 | | |
| | | 3 | 7.5 | | |
| | | 4 | 6.6 | | |
| | | 5 | 6 | | |
| | | 6 | 5.1 | | |
| | | 7 | 4.5 | | |
| | | 8 | 3.8 | 50.7 | 6.3375 |
| 14 | | 1 | 3.1 | | |
| | | 2 | 2.8 | | |
| | | 3 | 2.2 | | |
| | | 4 | 2 | 35.45 | 4.43125 |
| 15 | | 1 | 1.8 | | |
| | | 2 | 1.8 | | |
| | | 3 | 1.8 | | |
| | | 4 | 1.8 | 24.925 | 3.115625 |
| 16 | | 1 | 1.8 | | |
| | | 2 | 1.9 | | |
| | | 3 | 1.9 | | |
| | | 4 | 2 | 20.0626 | 2.5078125 |
| 17 | | 1 | 2 | | |
| | | 2 | 2.2 | | |
| | | 3 | 2.5 | | |
| | | 4 | 2.7 | 19.43125 | 2.42890525 |

FIG.16

| THRESHOLD | ADJUSTMENT VALUE |
|---|---|
| −36 | −9 |
| −32 | −8 |
| −28 | −7 |
| −24 | −6 |
| −20 | −5 |
| −16 | −4 |
| −12 | −3 |
| −8 | −2 |
| −4 | −1 |
| 4 | 1 |
| 8 | 2 |
| 12 | 3 |
| 16 | 4 |
| 20 | 5 |
| 24 | 6 |
| 28 | 7 |
| 32 | 8 |
| 36 | 9 |

312

VIBRATION CORRECTION CONTROL CIRCUIT FOR CORRECTING DISPLACEMENT OF AN OPTICAL AXIS DUE TO VIBRATION INCLUDING CAMERA SHAKE AND IMAGE PICKUP APPARATUS EQUIPPED THEREWITH

RELATED APPLICATIONS

This application is the U.S. National Phase under 35 U.S.C. §371 of International Application No. PCT/JP2009/057678, filed on Apr. 16, 2009, which in turn claims the benefit of Japanese Application No. 2008-116409, filed on Apr. 25, 2008 the disclosures of which Applications are incorporated by reference herein.

TECHNICAL FIELD

The present invention relates to a vibration correction control circuit for correcting displacement of an optical axis due to vibration including camera shake and also relates to an image pickup apparatus equipped with the vibration correction control circuit.

BACKGROUND ART

Digital cameras equipped with optical image stabilizers are in widespread use today. Optical image stabilization is a technique for correcting an optical axis using a vibration detection element for detecting vibration of a camera and also using a drive element for moving the position of the lens in such a direction as to counteract the displacement due to the vibration. A shift amount by which the lens is to be moved can be computed by integrating an acceleration signal output from a vibration detection element for detecting vibration.
Patent Document 1: JP2007-324929A

DISCLOSURE OF THE INVENTION

Problem to be Solved by the Invention

If a shift amount of the lens is computed in the aforementioned method, the lens will move according to an integrated value of the acceleration signal during image stabilization. Generally, variation in the integrated value is relatively small but, since the effect of the input value is relatively large in the early stage of the integration, the variation in the integrated value becomes large when the input value is large. Accordingly, at the stage when the integrated value is small, the lens will react oversensitively to an acceleration signal output from the vibration detection element. For example, if noise is mixed into the acceleration signal during a period of such a stage, the image within the finder will unnaturally move and the user will notice the movement.

The present invention has been made in view of such a situation, and a purpose thereof is to provide a vibration correction control circuit and an image pickup apparatus equipped therewith, which provide a vibration correction function with improved accuracy at the stage when the integrated value of an acceleration signal, which is to be set as a shift amount to be corrected, is small.

Means for Solving the Problem

A vibration correction control circuit of one embodiment of the present invention, which corrects displacement of an optical axis due to vibration applied to an image pickup apparatus, comprises: an integrating circuit configured to integrate an acceleration signal output from a vibration detection element for detecting vibration and generate a shift amount signal indicating a shift amount of the image pickup apparatus; and a control unit configured to control the integrating circuit. The integrating circuit is configured with a digital filter, which includes a register for retaining an integrated value to be set as a shift amount signal. The control unit acquires an integrated value retained in the register at predetermined time intervals and computes the variation value between the integrated value currently acquired and the integrated value previously acquired, and, if the variation value exceeds a predetermined threshold, the control unit subtracts from the integrated value currently acquired an adjustment value for bringing the variation value close to zero and re-sets the value retained in the register to the resulting value.

Another embodiment of the present invention is also a vibration correction control circuit. The vibration correction control circuit, which corrects displacement of an optical axis due to vibration applied to an image pickup apparatus, comprises: an integrating circuit configured to integrate an acceleration signal output from a vibration detection element for detecting vibration and generate a shift amount signal indicating a shift amount of the image pickup apparatus; and a control unit configured to control the integrating circuit. The integrating circuit is configured with a digital filter, which includes a register for retaining an integrated value to be set as a shift amount signal. The control unit acquires an integrated value retained in the register at predetermined time intervals, computes the variation value between the integrated value currently acquired and the integrated value previously acquired, subtracts from the integrated value currently acquired an adjustment value obtained by dividing the variation value by a predetermined value, and re-sets the value retained in the register to the resulting value.

Yet another embodiment of the present invention is also a vibration correction control circuit. The vibration correction control circuit, which corrects displacement of an optical axis due to vibration applied to an image pickup apparatus, comprises: an integrating circuit configured to integrate an angular velocity signal output from a vibration detection element for detecting vibration and generate a shift amount signal indicating a shift amount of the image pickup apparatus; and a control unit configured to control the integrating circuit. The integrating circuit is configured with a digital filter, which includes a register for retaining an integrated value to be set as a shift amount signal. The control unit acquires an integrated value retained in the register at predetermined time intervals and computes the variation value between the integrated value currently acquired and the integrated value previously acquired, and, if the variation value is continuously a predetermined threshold or less for a predetermined time, the control unit subtracts from an integrated value retained in the resister at the time when the predetermined time terminates, an adjustment value for bringing the integrated value close to zero and re-sets the value retained in the register to the resulting value.

Still yet another embodiment of the present invention is an image pickup apparatus. The image pickup apparatus comprises: a lens; an image pickup element; a drive element configured to drive the lens or the image pickup element; a position detection element configured to detect the position of the lens or the image pickup element; a vibration detection element configured to detect vibration; and a vibration correction control circuit. The vibration correction control circuit controls the drive element to correct the position of the lens or the image pickup element, on the basis of a position signal output from the position detection element and a shift amount signal.

Advantageous Effects

The present invention improves accuracy of a vibration correction function at the stage when the integrated value of an acceleration signal, which is to be set as a shift amount to be corrected, is small.

BEST MODE FOR CARRYING OUT THE INVENTION

FIG. 1 is a block diagram that shows an overall configuration of an image pickup apparatus 500 according to an embodiment of the present invention. The image pickup apparatus 500 comprises a vibration detection element 60, a lens 70, a position detection element 80, a drive element 90, a vibration correction control circuit 100, an image pickup element 200, and an image processor 300. In FIG. 1, a control unit 31, which will be described later, is omitted because of space limitations in the figure.

The image pickup element 200 converts an optical signal that has passed through the lens 70, which is an optical component, into an electric signal. For the image pickup element 200, a CCD sensor or a CMOS image sensor can be used. The image processor 300 performs various processes or compression encoding on an image signal captured by the image pickup element 200.

The drive element 90 drives the lens 70. For the drive element 90, a voice coil motor can be used, for example. The position detection element 80 detects the position of the lens 70. For the position detection element 80, a Hall element can be used, for example. A Hall element is a magnetic sensor using the Hall effect and functions as a position detection element for the lens 70 in the pan and tilt directions. The vibration detection element 60 detects vibration applied to the image pickup apparatus 500. For the vibration detection element 60, a gyro sensor can be used, for example. A gyro sensor detects vibration applied to the image pickup apparatus 500 in the yaw and pitch directions as angular velocities.

The vibration correction control circuit 100 corrects displacement of the optical axis due to vibration applied to the image pickup apparatus 500. More specifically, the vibration correction control circuit 100 controls the drive element 90 to correct the position of the lens 70 based on a position signal output from the position detection element 80 and a shift amount signal described later.

The vibration correction control circuit 100 includes an analog/digital conversion circuit 20, a first equalizer 30, a second equalizer 40, and a digital/analog conversion circuit 50. The analog/digital conversion circuit 20 converts an analog angular velocity signal output from the vibration detection element 60 to a digital angular velocity signal and outputs the converted signal to the first equalizer 30. The analog/digital conversion circuit 20 also converts an analog position signal output from the position detection element 80 to a digital position signal and outputs the converted signal to the second equalizer 40. The analog/digital conversion circuit 20 performs both the converting processes in a time-division manner.

The first equalizer 30 computes a shift amount of the image pickup apparatus 500 based on an angular velocity signal output from the vibration detection element 60 and generates a shift amount signal indicating the shift amount. When a gyro sensor is used as the vibration detection element 60, the first equalizer 30 generates an angular signal, which indicates an angle by which the image pickup apparatus 500 has moved, based on an angular velocity signal output from the gyro sensor. A shift amount of the image pickup apparatus 500 can be computed by integrating an output signal from the vibration detection element 60. The second equalizer 40 generates a control signal for driving the drive element 90 to correct the position of the lens 70, based on an output signal from the position detection element 80 and a shift amount signal generated by the first equalizer 30.

The digital/analog conversion circuit 50 converts a digital control signal output from the second equalizer 40 to an analog control signal and outputs the converted signal to the drive element 90. Based on the control signal, the drive element 90 controls the position of the lens 70 so that the optical axis of the lens 70 passes through the center of the image pickup element 200. The drive element 90 also controls the position of the lens 70 so as to correct a shift amount of the image pickup apparatus 500 in a vibration correction mode.

FIG. 2 is a configuration diagram for describing a vibration correction control circuit 100 according to an embodiment 1. In FIG. 2, the analog/digital conversion circuit 20 and digital/analog conversion circuit 50 are omitted.

A first gain adjustment circuit 32 adjusts the amplitude of an angular velocity signal output from the vibration detection element 60. More specifically, the first gain adjustment circuit 32 amplifies an angular velocity signal according to a gain specified by the control unit 31. The gain is specified within the range of 0 to 1.0. An integrating circuit 36 integrates an angular velocity signal output from the first gain adjustment circuit 32 to generate a shift amount signal indicating a shift amount to be corrected. In FIG. 2, a first selector 34a, a high-pass filter 34b, and a second selector 34c are provided between the first gain adjustment circuit 32 and integrating circuit 36; however, these components are not essential, and the first gain adjustment circuit 32 and integrating circuit 36 may be directly connected. As will be described later, when the high-pass filter 34b is configured with a digital filter, the functions of the first selector 34a and second selector 34c can also be provided by the digital filter.

A centering processing circuit 38 performs centering of a shift amount signal output from the integrating circuit 36 toward zero. The centering processing circuit 38 may be configured with a high-pass filter. A second gain adjustment circuit 39 then adjusts the amplitude of a shift amount signal on which centering has been performed by the centering processing circuit 38. More specifically, the second gain adjustment circuit 39 amplifies an angular velocity signal according to a gain specified by the control unit 31. The gain is normally set to 1.0. The case where the gain is set to less than 1.0 will be described later in the embodiment 4.

The control unit 31 refers to the amplitude value of a shift amount signal output from the integrating circuit 36 to control the gain of the first gain adjustment circuit 32. The control unit 31 may refer to the amplitude value of a shift amount signal output from the integrating circuit 36, may refer to the amplitude value of a shift amount signal output from the centering processing circuit 38, or may refer to the amplitude value of a shift amount signal output from the second gain adjustment circuit 39. Namely, the control unit 31 may refer to any of the points N2, N3, and N4 shown in FIG. 2.

When the amplitude value of such a shift amount signal lies between an outer threshold, which is a value used to detect the initiation of panning or tilting of the image pickup apparatus 500, and an inner threshold, which is a value set closer to zero than the outer threshold, the control unit 31 sets the gain of the first gain adjustment circuit 32 in the following way. That is, within the range between a gain G1 (G1 is a fixed value), which is employed when the amplitude value of the shift amount signal lies farther from zero than the outer threshold, and a gain G3 (G1<G3, G3 is a fixed value), which is employed when the amplitude value lies closer to zero than the inner threshold, the control unit 31 sets a gain G2 (G1<G2<G3). As the inner thresholds mentioned above, values having the same absolute value are set on the positive and negative sides, respectively. In the same way, as the outer thresholds, values having the same absolute value are set on the positive and negative sides, respectively, outside the inner thresholds.

For example, when the amplitude value of the shift amount signal lies farther from zero than the outer threshold, the control unit 31 sets the gain of the first gain adjustment circuit 32 to substantially zero, and, when the amplitude value lies closer to zero than the inner threshold, the control unit 31 sets the gain of the first gain adjustment circuit 32 to substantially 1.0. When the amplitude value lies between the outer threshold and the inner threshold, the control unit 31 sets the gain G2 of the first gain adjustment circuit 32 to a value within the range of 0<G2<1.0, such as 0.5. When G2 is set closer to zero, the image pickup apparatus 500 is less likely to enter into the panning mode or tilting mode, whereas, when G2 is set closer to 1.0, the image pickup apparatus 500 is more likely to enter into the panning mode or tilting mode.

When the amplitude value of the shift amount signal lies farther from zero than the outer threshold, the control unit 31 determines that it is the panning or tilting mode. In this state, the control unit 31 sets the gain of the first gain adjustment circuit 32 to substantially zero so as to invalidate the vibration correction processing and provide control such that the angular velocity signal output from the vibration detection element 60 is not input to the integrating circuit 36.

When the amplitude value of the shift amount signal lies closer to zero than the inner threshold, the control unit 31 determines that it is a normal vibration correction mode. In this state, the control unit 31 sets the gain of the first gain adjustment circuit 32 to substantially 1.0 so as to completely validate the vibration correction processing and provide control such that the angular velocity signal output from the vibration detection element 60 is input to the integrating circuit 36 as it is.

When the amplitude value of the shift amount signal lies between the outer threshold and the inner threshold, the control unit 31 determines that it is a state to be controlled so as to shift to a weak vibration correction mode in which the sensitivity of vibration correction processing is set weaker. When the amplitude value of the shift amount signal gets closer to the outer threshold, the amplitude value may exceed the outer threshold even when low-frequency vibration due to camera shake is added while panning or tilting is not performed. Accordingly, by shifting the image pickup apparatus 500 to the weak vibration correction mode so as to attenuate the amplitude value of the angular velocity signal, a rise in the integrated value integrated by the integrating circuit 36, i.e., a rise in the amplitude value of the shift amount signal, can be suppressed.

When the amplitude value of the shift amount signal lies between the outer threshold and the inner threshold, the control unit 31 refers to the amplitude value of the angular velocity signal and compares the amplitude value with a predetermined value. If the amplitude value of the angular velocity signal lies closer to zero than the predetermined value, the gain G3, which is employed when the amplitude value of the shift amount signal lies closer to zero than the inner threshold, may be set for the first gain adjustment circuit 32. As the predetermined values mentioned above, values having the same absolute value are set on the positive and negative sides, respectively.

More specifically, even if it is a state to be controlled to shift to the weak vibration correction mode, when the amplitude value of the angular velocity signal output from the vibration detection element 60 (point N1) lies closer to zero than the predetermined value, control is provided so that the normal vibration correction mode is maintained. It is because, if the image pickup apparatus 500 is shifted to the weak vibration correction mode when the angular velocity signal is weak, the image within the finder will unnaturally move because the sensitivity of vibration correction processing is lowered and the user will notice the movement.

Each of the aforementioned outer threshold, inner threshold, gain of the first gain adjustment circuit 32 in the weak vibration correction mode, and predetermined value may be set to a value for achieving a sensitivity of vibration correction processing desired by the designer, based on experimental results or simulation results.

When the first selector 34a, high-pass filter 34b, and second selector 34c are provided, the high-pass filter 34b performs filtering on an angular velocity signal output from the first gain adjustment circuit 32 and outputs the resulting signal to the integrating circuit 36. As will be described later, the high-pass filter 34b has a function to perform centering of an angular velocity signal toward zero.

The control unit 31 may disable the high-pass filter 34b when the amplitude value of the shift amount signal lies closer to zero than the inner threshold, and may enable the high-pass filter 34b when the amplitude value lies between the outer threshold and the inner threshold. Also, the control unit 31 may decrease the capability of the high-pass filter 34b when the amplitude value of the shift amount signal lies closer to zero than the inner threshold, and may increase the capability of the high-pass filter 34b when the amplitude value lies between the outer threshold and the inner threshold. For example, in the normal is vibration correction mode, the control unit 31 selects the route bypassing the high-pass filter 34b and controls the first selector 34a and second selector 34c accordingly. In the weak vibration correction mode, the control unit 31 selects the route passing through the high-pass filter 34b and controls the first selector 34a and second selector 34c accordingly. In the state to be controlled to shift to the weak vibration correction mode, the control unit 31 enables the high-pass filter 34b to perform centering of the angular velocity signal, thereby suppressing a rise in the integrated value integrated by the integrating circuit 36, or a rise in the amplitude value of the shift amount signal. In the panning mode or tilting mode, however, since control is provided so that the first gain adjustment circuit 32 negates the angular velocity signal, enabling or disabling the high-pass filter 34b has no influence on the overall control and the high-pass filter 34b may be either enabled or disabled.

Even if it is a state to be controlled to shift to the weak vibration correction mode, when the amplitude value of the angular velocity signal output from the vibration detection element 60 (point N1) lies closer to zero than the predetermined value, the control unit 31 may disable the high-pass filter 34b.

An adding circuit 42 adds a position signal output from the position detection element 80 and a shift amount signal output from the first equalizer 30. A servo circuit 44 then generates a control signal for driving the drive element 90 according to the output signal from the adding circuit 42.

FIG. 3 is a circuit diagram that shows an example of a digital filter 10 with which the high-pass filter 34b, integrating circuit 36, and centering processing circuit 38 can be configured. The integrating circuit 36 can be configured with a low-pass filter, and the centering processing circuit 38 can be configured with a high-pass filter.

The digital filter 10 includes a first multiplier 11, a first register 12, a second multiplier 13, an adder 14, a second register 15, and a third multiplier 16. The first multiplier 11 multiplies an input value Xn by a coefficient a. The first register 12 temporarily retains the input value Xn. The second multiplier 13 multiplies an input value X(n−1), which is an input value in the preceding sampling period retained in the first register 12, by a coefficient b. The adder 14 adds an output value of the first multiplier 11, an output value of the second multiplier 13, and an output value of the third multiplier 16 together. The second register 15 temporarily retains an output value of the adder 14. The third multiplier 16 multiplies an output value Y(n−1), which is an output value in the preceding sampling period retained in the second register 15, by a coefficient c.

Namely, the digital filter 10 performs the operation as defined by the following Formula 1.

$$Yn = Xn \cdot a + X(n-1) \cdot b + Y(n-1) \cdot c \quad \text{(Formula 1)}$$

wherein Xn (n=1, 2, 3 . . . ) is an input value, Yn is an output value, a is a coefficient for the first multiplier 11, b is a coefficient for the second multiplier 13, and c is a coefficient for the third multiplier 16.

When a low-pass filter is configured with the digital filter 10, the coefficient a for the first multiplier 11, the coefficient b for the second multiplier 13, and the coefficient c for the third multiplier 16 are set to satisfy the relationship as defined by the following Formula 2.

$$(0<) a \approx b << c \quad \text{(Formula 2)}$$

In this case, the effect of the system consisting of the second register 15 and third multiplier 16 becomes large, so that the main function of the digital filter 10 will be cumulative addition. Accordingly, the digital filter 10 has an integration function, and an integral value is stored in the second register 15. The coefficient a and coefficient b are set to substantially the same value, so that a delay component of the input value in the preceding sampling period is added so as to reduce random noise. If the coefficient a and coefficient b are set to be much smaller than the coefficient c, a rise in the integral value can be suppressed more effectively. When the integrating circuit 36 is configured with such a digital filter 10, the ratio among the coefficient a, coefficient b, and coefficient c may be set to a value for achieving a sensitivity of vibration correction processing desired by the designer.

When a high-pass filter is configured with the digital filter 10, the coefficient a for the first multiplier 11, the coefficient b for the second multiplier 13, and the coefficient c for the third multiplier 16 are set to satisfy the relationships as defined by the following Formulae 3 and 4.

$$a \approx -b \quad \text{(Formula 3)}$$

$$c > 0 \quad \text{(Formula 4)}$$

In this case, when the adder 14 adds an output from the first multiplier 11 and an output from the second multiplier 13, the resulting value indicates a variation in the input value during a sampling period. By cumulatively adding such variations using the system consisting of the second register 15 and third multiplier 16, the filter only outputs a high-frequency component.

More specifically, if the frequency of an input value is low, the variation in the input value will be small; accordingly, even if the variation is added to the output value in the preceding sampling period, the variation in the output value will be also small. As a result, no low-frequency component seems to pass through. On the other hand, if the frequency of an input value is high, the variation in the input value will be large; accordingly, if the variation is added to the output value in the preceding sampling period, the variation in the output value will be also large. As a result, a high-frequency component seems to pass through. With the digital filter 10, the high-pass filter 34b and centering processing circuit 38 can be configured.

FIG. 4 is a diagram that shows examples of an angular velocity signal output from the vibration detection element 60, a shift amount signal output from the integrating circuit 36, and a shift amount signal output from the centering processing circuit 38. With reference to FIG. 2, an angular velocity signal output from the vibration detection element 60 means a signal at the point N1, a shift amount signal output from the integrating circuit 36 means a signal at the point N2, and a shift amount signal output from the centering processing circuit 38 means a signal at the point N3.

In FIG. 4, the curve of the angular velocity signal output from the vibration detection element 60 (point N1) is bowed upward within the regions R1, R2, and R3 (circled in FIG. 4). In response thereto, the amplitude value of the shift amount signal output from the integrating circuit 36 (point N2) shows rises. Since the centering processing circuit 38 removes the low-frequency component, i.e., the direct-current component, of the shift amount signal integrated by the integrating circuit 36, the shift amount signal output from the centering processing circuit 38 (point N3) is a signal obtained by removing an offset component from the aforementioned shift amount signal (point N2).

FIG. 5 is a diagram that shows an example of a shift amount signal output from the centering processing circuit 38 according to the embodiment 1. The control unit 31 monitors a shift amount signal output from the centering processing circuit 38 (point N3) to determine whether or not to shift the mode to the panning or tilting mode. Also, since the gain of the second gain adjustment circuit 39 is set to 1.0, the control unit 31 may monitor a shift amount signal output from the second gain adjustment circuit 39 (point N4) instead of the shift amount signal output from the centering processing circuit 38 (point N3).

The threshold 1 in FIG. 5 corresponds to the inner threshold described previously, and the threshold 2 corresponds to the outer threshold. The area between the thresholds 1 and 2 is an area to be controlled so as to shift to the weak vibration correction mode. The region R4 in FIG. 5 indicates the situation where a normal vibration correction mode has shifted to the weak vibration correction mode, so that a rise in the amplitude value of the shift amount signal is suppressed and the image pickup apparatus 500 does not enter into the panning or tilting mode. The region R5 indicates the situation where the amplitude value of the shift amount signal has exceeded the threshold 2 and the image pickup apparatus 500 has entered into the panning or tilting mode.

FIG. 6 is a flowchart of processing for determining if the image pickup apparatus 500 has entered into the panning mode or tilting mode according to the embodiment 1. While image stabilization processing is properly performed, the control unit 31 monitors a shift amount signal output from the integrating circuit 36, centering processing circuit 38, or second gain adjustment circuit 39 (S11). The control unit 31 then determines if the absolute value of the amplitude value of the shift amount signal has exceeded the absolute value of the inner threshold (S12). If the absolute value of the amplitude value has not exceeded the absolute value of the inner threshold (N at S12), the control unit 31 determines that it is a normal image stabilization mode, so that the control unit 31 sets the gain of the first gain adjustment circuit 32 to 1.0 (S13) and disables the high-pass filter 34b (S14).

If the absolute value of the amplitude value of the shift amount signal has exceeded the absolute value of the inner threshold at step S12 (Y at S12), the control unit 31 determines if the absolute value of the amplitude value of the shift amount signal has exceeded the absolute value of the outer threshold (S15). If the absolute value of the amplitude value has not exceeded the absolute value of the outer threshold (N at S15), the control unit 31 will monitor the angular velocity signal output from the vibration detection element 60 (S16).

The control unit 31 then determines if the absolute value of the amplitude value of the angular velocity signal has exceeded the absolute value of a predetermined value (S17). If the absolute value of the amplitude value has not exceeded the absolute value of the predetermined value (N at S17), the process will shift to step S13 and processing will be performed in the same way as the case of the normal image stabilization mode. If the absolute value of the amplitude value has exceeded the absolute value of the predetermined value (Y at S17), the control unit 31 determines that it is a state to be controlled to shift to a weak image stabilization mode, so that the control unit 31 sets the gain of the first gain adjustment circuit 32 to 0.5 (S18) and enables the high-pass filter 34b (S19).

If the absolute value of the amplitude value of the shift amount signal has exceeded the absolute value of the outer threshold at step S15 (Y at S15), the control unit 31 determines that it is the panning or tilting mode, so that the control unit 31 sets the gain of the first gain adjustment circuit 32 to zero (S20) and disables the high-pass filter 34b (S21).

As described above, according to the embodiment 1, when the amplitude value of the shift amount signal gets closer to a threshold with which if the panning or tilting mode has started is determined, a rise in the amplitude value of the shift amount signal can be suppressed by attenuating the amplitude value of the angular velocity signal. Accordingly, while the sensitivity is maintained even for a low frequency band, the situation can be prevented in which vibration correction is stopped in a state where vibration should be actually corrected because it is wrongly determined that panning or tilting is performed. Also, in addition to the attenuation of the angular velocity signal, if such angular velocity signal is input to a high-pass filter, the rise in the amplitude value of the shift amount signal can be further suppressed.

Even when the amplitude value of the shift amount signal gets closer to the threshold with which if the panning or tilting mode has started is determined, the attenuation of the angular velocity signal as described above may not be performed if the amplitude value of the angular velocity signal is small. In this case, the situation can be prevented in which the image within the finder unnaturally moves because of the attenuation and the user notices the movement.

FIG. 7 is a configuration diagram for describing the vibration correction control circuit 100 according to an embodiment 2. The configuration of the vibration correction control circuit 100 according to the embodiment 2 is identical with that of the vibration correction control circuit 100 according to the embodiment 1. Although attention is focused on the control of the first gain adjustment circuit 32 and high-pass filter 34b in the embodiment 1, the embodiment 2 describes the control of the integrating circuit 36 and centering processing circuit 38.

The control of the first gain adjustment circuit 32 and high-pass filter 34b is not limited to the control as described in the embodiment 1. For example, there may be a configuration in which the inner threshold is not provided and the weak vibration correction mode is not considered. In such a case, the control unit 31 determines that it is the panning or tilting mode when an amplitude value exceeds the outer threshold and that it is a normal vibration correction mode when an amplitude value does not exceed the outer threshold. In the former case, the control unit 31 sets the gain of the first gain adjustment circuit 32 to substantially zero, and, in the latter case, the control unit 31 sets the gain to substantially 1.0.

The control unit 31 determines whether or not the image pickup apparatus 500 is in the panning or tilting mode. As described in the embodiment 1, the control unit 31 refers to the amplitude value of a shift amount signal output from the integrating circuit 36 (point N2), the amplitude value of a shift amount signal output from the centering processing circuit 38 (point N3), or the amplitude value of a shift amount signal output from the second gain adjustment circuit 39 (point N4) so as to determine whether or not the image pickup apparatus 500 has entered into the panning or tilting mode. Also, as will be described in the embodiment 3, the control unit 31 may refer to the average value of the amplitude value of an angular velocity signal output from the vibration detection element 60 (point N1) to determine whether or not the image pickup apparatus 500 has entered into the panning or tilting mode.

The integrating circuit 36 is configured with a digital filter, which includes a register for retaining an integrated value to be set as the amplitude value of a shift amount signal. When the digital filter is configured with the digital filter 10 as shown in FIG. 3, such an integrated value is retained in the second register 15.

When the control unit 31 determines that it is the panning or tilting mode, the control unit 31 decreases the absolute value of the integrated value retained in the register set forth above. On this occasion, it is desirable to gradationally decrease the absolute value of the integrated value. In the panning or tilting mode, since the control unit 31 sets the gain of the first gain adjustment circuit 32 to substantially zero, inputting of an angular velocity signal to the integrating circuit 36 is invalidated.

The centering processing circuit 38 may be configured with a digital high-pass filter. When the control unit 31 determines that it is the panning or tilting mode, the control unit 31 may change a coefficient for the digital high-pass filter so that the cutoff frequency of the digital high-pass filter becomes higher. For example, the control unit 31 sets the cutoff frequency of the digital high-pass filter to 0.3 Hz in the panning or tilting mode and to 0.1 Hz in the other modes.

If the digital high-pass filter is configured with the digital filter 10 as shown in FIG. 3, the control unit 31 decreases the values of the coefficients a and c and increases the value of the coefficient b to set the cutoff frequency of the digital filter 10 higher. Accordingly, since the output value Y(n−1) in the preceding sampling period added by the adder 14 decreases, the decrease of the output value Y can be accelerated. Therefore, by changing the coefficients a, b, and c for the digital filter 10, the centering performance of the centering processing circuit 38 can be improved. Conversely, to set the cutoff frequency lower, the control unit 31 increases the values of the coefficients a and c and decreases the value of the coefficient b.

FIG. 8 is a diagram that shows the transition of the integrated value retained by the second register 15 in the case where the integrating circuit 36 is configured with the digital filter 10 as shown in FIG. 3. In FIG. 8, the period before time T1 shows the vibration correction mode, and the period after time T1 shows the panning or tilting mode. When the mode has shifted to the panning or tilting mode, the control unit 31 gradually decreases the integrated value retained in the second register 15 as shown in region R6. In the example of FIG. 8, the control unit 31 subtracts a certain fixed value from the integrated value retained in the second register 15 every unit time and re-sets the value retained in the second register 15 to the resulting value. The value to be subtracted is not limited to a fixed value, and the value to be subtracted from the integrated value may be set to a small value in the early stage of the panning or tilting mode and may be gradually changed to a larger value as time elapses, for example.

Thus, according to the embodiment 2, an integrated value to be set as a shift amount signal to be corrected is retained in a register within the integrating circuit configured with a digital filter and is decreased during the panning or tilting mode, thereby providing the following effects. That is, when the panning or tilting mode terminates, the vibration correction function can be restarted with the lens positioned at the center position or positioned as close to the center position as possible. Accordingly, enough movable ranges can be secured for the lens both in the pan and tilt directions. Also, the movement mode of the lens can be flexibly set by decreasing the integrated value in the register.

Further, by gradationally decreasing the integrated value in the register, the situation can be prevented in which the image within the finder unnaturally moves and the user notices the movement. Also, by setting a higher cutoff frequency for a high-pass filter, which performs centering of the amplitude value of a shift amount signal output from the integrating circuit, during the panning or tilting mode, the centering performance of the high-pass filter can be improved in comparison with that in the vibration correction mode. In addition, the user is less likely to notice the movement of the image within the finder caused by the centering.

FIG. 9 is a configuration diagram for describing the vibration correction control circuit 100 according to an example 1 of an embodiment 3. The configuration of the vibration correction control circuit 100 according to the example 1 of the embodiment 3 is identical with that of the vibration correction control circuit 100 according to the embodiment 1. Although the embodiment 1 describes the setting of the weak vibration correction mode and the determination of the initiation of the panning or tilting mode, the example 1 of the embodiment 3 describes the determination of the termination of the panning or tilting mode.

The control unit 31 determines the termination of the panning or tilting mode in the image pickup apparatus 500 in the following way. That is, the control unit 31 samples the amplitude value of an angular velocity signal output from the vibration detection element 60 multiple times within a predetermined unit period during the panning or tilting mode, and, when the average value of the sampling values lies closer to zero than a predetermined basic threshold, the control unit 31 determines that the panning or tilting mode has terminated. After determining the termination of the panning or tilting mode, the control unit 31 sets the gain of the first gain adjustment circuit 32 to substantially 1.0, as described in the embodiment 1.

In the example 1 of the embodiment 3, the method for determining the initiation of the panning or tilting mode is not particularly specified. For example, the method described in the embodiment 1 may be employed. Alternatively, the control unit 31 may sample the amplitude value of an angular velocity signal output from the vibration detection element 60 multiple times within a predetermined unit period, and, when the average value of the sampling values lies farther from zero than a predetermined basic threshold, the control unit 31 may determine that the panning or tilting mode has started.

When the amplitude value of an angular velocity signal sampled in the panning or tilting mode lies farther from zero than an outer threshold set to be farther from zero than the basic threshold, the control unit 31 may stop the determination of the termination of the panning or tilting mode until the amplitude value gets closer to zero than the outer threshold. By setting the outer threshold, an abnormal value of the angular velocity signal due to noise or the like, which is greatly distant from zero, can be detected. If such an abnormal value is included in sampling values of which the average value is calculated, the average value will be affected thereby and will cause misjudgment.

The integrating circuit 36 may be configured with a digital filter, which may include a register for retaining an integrated value to be set as the amplitude value of the shift amount signal. When the digital filter is configured with the digital filter 10 as shown in FIG. 3, such an integrated value is retained in the second register 15. In the panning or tilting mode, the control unit 31 may gradationally decrease the absolute value of the integrated value retained in the register.

In this case, when the average value set forth above lies closer to zero than the basic threshold and, in addition, the integrated value retained in the register is a predetermined value or less, the control unit 31 determines that the panning or tilting mode has terminated; in the other situations, the control unit 31 does not determine the termination of the panning or tilting mode. Namely, even when the average value lies closer to zero than the basic threshold, if the integrated value retained in the register exceeds the predetermined value, the control unit 31 will not determine the termination of the panning or tilting mode. In other words, when the lens is positioned greatly distant from the center position, restarting of vibration correction processing is suspended until the lens gets closer to the center position, for the purpose as described in the embodiment 2.

As the basic thresholds mentioned above, values having the same absolute value are set on the positive and negative sides, respectively. In the same way, as the outer thresholds, values having the same absolute value are set on the positive and negative sides, respectively, outside the basic thresholds. Also, as the predetermined values mentioned above, other values having the same absolute value are set on the positive and negative sides, respectively. Each of the aforementioned basic threshold, outer threshold, unit period, number of sampling during the unit period, and predetermined value may be set to a value for achieving a sensitivity of vibration correction processing desired by the designer, based on experimental results or simulation results.

FIG. 10 is a diagram that shows another example of an angular velocity signal output from the vibration detection element 60 according to the example 1 of the embodiment 3. FIGS. 11A and 11B is a diagram that shows a process and result of computation of an average value in each unit period based on an angular velocity signal shown in FIG. 10. A number (1-18) is given at the beginning of each unit time on the horizontal axis in FIG. 10, and the number also appears in the item "period beginning" in FIGS. 11A and 11B.

The control unit 31 monitors an angular velocity signal output from the vibration detection element 60 (point N1) to determine whether or not to terminate the panning or tilting mode. The control unit 31 samples the amplitude value of the angular velocity signal multiple times within a predetermined unit period and determines whether or not the average value of the sampling values in each unit time lies closer to zero than a threshold 3.

When the divisor used to compute the average value is defined as n (n is a positive even number), the control unit 31 may add one-half of the average value in the preceding unit period and the total of n/2 sampling values in the current unit period and divide the resulting value by n, thereby obtaining the average value in the current unit period.

In the examples of FIGS. 10 and 11, the number of sampling performed in each unit period is set to eight. Also, the threshold 3 is set to 5, and the threshold 4 is set to 10. The control unit 31 samples the amplitude value of the angular velocity signal eight times within the unit period 1 (hereafter, the period between the period beginning 1 and the period beginning 2 is referred to as the unit period 1, and the unit period 2 and the subsequent unit periods are defined in the same way) and divides the total of the sampling values by eight, thereby computing the average value in the unit period 1. In the example of FIGS. 11A and 11B, the average value in the unit period 1 is 6.7625. Since the absolute value of this average value exceeds the absolute value of the threshold 3, the control unit 31 determines that it is the panning or tilting mode.

The control unit 31 samples the amplitude value of the angular velocity signal four times within the unit period 2, adds the total of the sampling values and "one-half of the average value in the unit period 1", and divides the resulting value by eight, thereby computing the average value in the unit period 2. In the example of FIGS. 11A and 11B, the average value in the unit period 2 is 7.34375. Thus, in the computation of the average value in the unit period 2 or a subsequent period, "one-half of the average value in the preceding unit period" will be used, so that the number of sampling can be reduced.

In the example of FIGS. 11A and 11B, since the average value in the unit period 6 falls below the threshold 3, the control unit 31 terminates the panning or tilting mode at the period beginning 7. Thereafter, the control unit 31 initiates the panning or tilting mode again at the period beginning 11, for example. The control unit 31 may monitor the shift amount signal instead of the angular velocity signal to determine the initiation of the panning or tilting mode. Alternatively, the control unit 31 may continue the computation of the average value and determine the initiation of the panning or tilting mode when the absolute value of the average value exceeds the absolute value of the threshold 3.

In the example of FIGS. 11A and 11B, the third sampling value in the unit period 12 exceeds the threshold 4. Thereafter, the control unit 31 stops the computation of the average value while the absolute value of the amplitude value of a sampled angular velocity signal exceeds the absolute value of the threshold 4. Also, the control unit 31 resets the "one-half of the average value in the preceding unit period".

When the amplitude value of a sampled angular velocity signal falls below the threshold 4, the control unit 31 restarts the computation of the average value. In the example of FIGS. 11A and 11B, the computation of the average value is restarted in the unit period 13. Since the "one-half of the average value in the preceding unit period" is not used, the control unit 31 samples the amplitude value of the angular velocity signal eight times within the unit period 13 and divides the total of the sampling values by eight.

As described above, according to the example 1 of the embodiment 3, the termination of the panning or tilting mode is determined based on an average value of the amplitude value of the angular velocity signal, so that such determination can be performed with high accuracy. Also, since an outer threshold is set in a position farther from zero than a basic threshold used for determination, an abnormal value of the angular velocity signal can be detected. In addition, since the determination of the termination is stopped in a unit period in which such an abnormal value is detected, the situation can be prevented in which the average value is affected by the abnormal value. Accordingly, the accuracy of the determination can be more improved.

Also, since an integrated value retained in the register within the integrating circuit is added as a condition of the determination of the termination, vibration correction processing can be restarted while the lens is positioned within an appropriate range. Further, when the average value is computed in each unit period, part of the average value in the preceding unit period is used, so that the number of sampling and the amount of operation in the current unit period can be reduced. By using part of the average value in the preceding unit period, variation in the average value can be suppressed, thereby achieving the effect of determining the termination of the panning or tilting mode more suppressively.

FIG. 12 is a configuration diagram for describing the vibration correction control circuit 100 according to an example 2 of the embodiment 3. The configuration of the vibration correction control circuit 100 according to the example 2 of the embodiment 3 is identical with that of the vibration correction control circuit 100 according to the embodiment 1. Although the embodiment 1 describes the setting of the weak vibration correction mode and the determination of the initiation of the panning or tilting mode, the example 2 of the embodiment 3 describes the determination of the termination of the weak vibration correction mode.

In the following way, the control unit 31 determines the termination of the weak vibration correction mode, which is a state between the panning or tilting mode in which vibration correction processing is invalidated and the vibration correction mode in which the vibration correction processing is validated, and is a state in which the sensitivity of the vibration correction processing is set to be weaker than in the vibration correction mode.

The control unit 31 samples the amplitude value of the shift amount signal multiple times within a predetermined unit period during the weak vibration correction mode, and, when the average value of the sampling values lies closer to zero than a predetermined threshold 6, the control unit 31 determines that the weak vibration correction mode has terminated. The control unit 31 may refer to the amplitude value of a shift amount signal output from the integrating circuit 36, may refer to the amplitude value of a shift amount signal output from the centering processing circuit 38, or may refer to the amplitude value of a shift amount signal output from the second gain adjustment circuit 39. Namely, the control unit 31 may refer to any of the points N2, N3, and N4 shown in FIG. 12. As the thresholds 6 mentioned above, values having the same absolute value are set on the positive and negative sides, respectively. The threshold 6 may be set to a value for achieving a sensitivity of vibration correction processing desired by the designer, based on experimental results or simulation results.

The method for computing an average value described in the example 1 of the embodiment 3 (the method using the "one-half of the average value in the preceding unit period") can be used also in the example 2 of the embodiment 3. However, since the amplitude value of the shift amount signal mentioned above is an integrated value and since the variation of the amplitude value of the shift amount signal is generally smaller than that of the amplitude value of the angular velocity signal, the necessity of providing the outer threshold is less than in the case of computing an average value of the amplitude value of the angular velocity signal.

As described above, according to the example 2 of the embodiment 3, the termination of the weak vibration correction mode is determined based on an average value of the amplitude value of the shift amount signal, so that such determination can be performed with high accuracy.

FIG. 13 is a configuration diagram for describing the vibration correction control circuit 100 according to an embodiment 4. The configuration of the vibration correction control circuit 100 according to the embodiment 4 is identical with that of the vibration correction control circuit 100 according to the embodiment 1. The embodiment 4 describes the control of the first gain adjustment circuit 32, centering processing circuit 38, and second gain adjustment circuit 39.

The second gain adjustment circuit 39 adjusts the amplitude of a shift amount signal output from the centering processing circuit 38. The control unit 31 detects the termination of the panning or tilting mode in the image pickup apparatus 500. The method for the determination of the termination is not particularly specified, and the method described in the embodiment 3 may be used. Similarly, the method for the determination of the initiation of the panning or tilting mode is also not particularly specified, and the method described in the embodiment 1 may be used.

Upon detection of the termination of the panning or tilting mode, the control unit 31 returns the lowered gain of the first gain adjustment circuit 32 to the original gain and, conversely, lowers the gain of the second gain adjustment circuit 39 to a certain value; thereafter, the control unit 31 gradationally raises the gain of the second gain adjustment circuit 39 to the original gain. As described in the embodiment 1, the gain of the first gain adjustment circuit 32 is set to substantially zero in the panning or tilting mode. In the other modes, except for the weak vibration correction mode, the gain is set to substantially 1.0. In such instance, the lowered gain of the first gain adjustment circuit 32 is substantially zero, and the original gain of the first gain adjustment circuit 32 is substantially 1.0.

The gain of the second gain adjustment circuit 39 is generally set to substantially 1.0 during both the vibration correction mode and the panning or tilting mode. In this case, the original gain of the second gain adjustment circuit 39 is substantially 1.0. The speed of lowering the gain of the second gain adjustment circuit 39 to the certain value or returning the gain to the original gain may be arbitrarily specified by the designer based on experimental results or simulation results. For example, the certain value may be set to 0.5.

The centering processing circuit 38, which is configured with a digital high-pass filter, performs centering of a shift amount signal output from the integrating circuit 36 toward zero and outputs the resulting signal to the second gain adjustment circuit 39. Upon detection of the termination of the panning or tilting mode, the control unit 31 may change a coefficient for the digital high-pass filter so that the raised cutoff frequency of the digital high-pass filter returns to the original frequency.

For example, the control unit 31 sets the cutoff frequency of the digital high-pass filter to 0.3 Hz in the panning or tilting mode and to 0.1 Hz in the other modes (such as in the vibration correction mode). In this case, the original frequency to which the cutoff frequency of the digital high-pass filter returns means 0.1 Hz. If the digital high-pass filter is configured with the digital filter 10 as shown in FIG. 3, the control unit 31 decreases the values of the coefficients a and c and increases the value of the coefficient b to set the cutoff frequency of the digital filter 10 higher. Conversely, to set the cutoff frequency lower, the control unit 31 increases the values of the coefficients a and c and decreases the value of the coefficient b.

Upon detection of the termination of the panning or tilting mode, the control unit 31 lowers the gain of the second gain adjustment circuit 39 to a certain value and then gradationally raises the gain to the original gain. On this occasion, it is preferable that the control unit 31 changes the coefficients for the digital high-pass filter at substantially the same time as the gain of the second gain adjustment circuit 39 returns to the original gain. If the control unit 31 changes the coefficients for the digital high-pass filter before the gain of the second gain adjustment circuit 39 returns to the original gain, the variation of the shift amount signal due to the change of the gain will coincide with the variation of the shift amount signal due to the change of the coefficients. Conversely, if the control unit 31 changes the coefficients for the digital high-pass filter when a certain period of time elapses after the gain of the second gain adjustment circuit 39 returns to the original gain, the effect of centering performed by the centering processing circuit 38 will become too large during the certain period of time.

As a matter of course, if the time difference between the time at which the gain of the second gain adjustment circuit 39 returns to the original gain and the time at which the coefficients for the digital high-pass filter are changed is small, such influence as described above will be little, thereby obtaining an effect similar to that provided when the times mentioned above coincide with each other.

FIG. 14 shows examples of a shift amount signal a1 in the pan direction and a shift amount signal a2 in the tilt direction. In FIG. 14, the period tp is a period during which it is determined that the image pickup apparatus 500 is in the panning or tilting mode. Also, the period th is a period during which the cutoff frequency of a high-pass filter constituting the centering processing circuit 38 is set to be higher than usual.

By adjusting the setting position of the threshold 2 described previously, the control unit 31 can detect a shift to the panning or tilting mode before such shift completes. The control unit 31 then sets the gain of the first gain adjustment circuit 32 to substantially zero both in the system to which an angular velocity signal in the pan direction is input and in the system to which an angular velocity signal in the tilt direction is input, and changes the cutoff frequency of the high-pass filter constituting the centering processing circuit 38 from 0.1 Hz to 0.3 Hz. That is, the control unit 31 regards the vibration caused in the panning or tilting mode as invalid and increases the centering effect on the lens.

Upon determination of the termination of the panning or tilting mode, the control unit 31 lowers the gain of the second gain adjustment circuit 39 to substantially 0.5 and then gradually returns the gain to substantially 1.0. At the time when the gain of the second gain adjustment circuit 39 returns to substantially 1.0, the control unit 31 returns the cutoff frequency of the high-pass filter constituting the centering processing circuit 38 to 0.1 Hz.

It can be seen that both the shift amount signal a1 in the pan direction and the shift amount signal a2 in the tilt direction smoothly move toward the center during the period tp. It can be also seen that there is no distortion in the shift amount signal a1 in the pan direction and the shift amount signal a2 in the tilt direction both after the termination of the period tp and after the termination of the period th.

As described above, according to the embodiment 4, when the panning or tilting mode terminates and the vibration correction function restarts, the effect caused by a change of the gain of the first gain adjustment circuit 32 can be reduced by temporarily lowering the gain of the second gain adjustment circuit 39. Namely, during the period in which the angular velocity signal starts to affect the shift amount signal because the gain of the first gain adjustment circuit 32 returns to the original gain, variation in the shift amount signal can be suppressed.

Also, by changing the cutoff frequency of the high-pass filter constituting the centering processing circuit 38 at substantially the same time as the gain of the second gain adjustment circuit 39 returns to the original gain, both the effect caused by the change of the gain of the first gain adjustment circuit 32 and the effect caused by the change of the cutoff frequency of the high-pass filter can be appropriately distributed. Accordingly, unnatural movement in the image that could occur when the vibration correction function restarts can be prevented.

FIG. 15 is a configuration diagram for describing the vibration correction control circuit 100 according to an embodiment 5. The configuration of the vibration correction control circuit 100 according to the embodiment 5 is identical with that of the vibration correction control circuit 100 according to the embodiment 1. In the embodiment 5, attention is focused on the control of the integrating circuit 36.

The integrating circuit 36 of the embodiment 5 is configured with a digital filter, which includes a register for retaining an integrated value to be set as the amplitude value of the shift amount signal. When the digital filter is configured with the digital filter 10 as shown in FIG. 3, such an integrated value is retained in the second register 15.

First, an example 1 of the embodiment 5 will be described. The correction processing according to the example 1 is preferably performed at the stage when the integrated value of an angular velocity signal, which is to be set as a shift amount to be corrected, is small. For example, the correction processing may be performed for a certain period of time after the activation of the vibration correction function. If the vibration correction function is activated by pressing the shutter button halfway, the correction processing will be performed for a certain period of time after the shutter button is pressed halfway. Also, if the vibration correction function is activated by turning on the main power, the correction processing will be performed for a certain period of time after the main power is turned on. The correction processing may be performed for a certain period of time after the mode has shifted from the panning or tilting mode to the vibration correction mode. During each of the periods cited above, the integrated value is likely to vary significantly.

The control unit 31 acquires the integrated value retained in the register at predetermined time intervals and computes the variation value between the integrated value currently acquired and the integrated value previously acquired; if the variation value exceeds a predetermined threshold, the control unit 31 will subtract an adjustment value, which is provided to bring the variation value close to zero, from the integrated value currently acquired and re-set the value retained in the register to the resulting value. Since the variation value could be either positive or negative, a pair of values having the same absolute value are set on the positive and negative sides, respectively, as the thresholds mentioned above. More strictly, the variation value's exceeding the threshold means that the variation value exceeds the threshold in the direction in which the absolute value increases. A plurality of the pair of thresholds may be provided in stages, and an example of such a case will be described below.

First, an example will be described in which is referred to a table that relates multiple thresholds provided in stages to multiple adjustment values also provided in stages and proportional to the multiple thresholds. These multiple thresholds and multiple adjustment values are provided on the positive and negative sides symmetrically.

The control unit 31 refers to the table described above and determines an adjustment value to be subtracted from the integrated value according to which threshold the variation value has exceeded among the thresholds included in the table. More specifically, the control unit 31 specifies an adjustment value related to a threshold of which the difference from the variation value is smallest among one or more thresholds that exceed the variation value in the direction in which the absolute value increases.

If the change from the integrated value previously acquired to the integrated value currently acquired is a diffusion change in the direction away from zero, the control unit 31 may subtract from the integrated value currently acquired an adjustment value that will adjust the integrated value toward zero more greatly than in the case of a convergence change in the direction toward zero. If the variation value is a positive value, the change will be a diffusion change when the shift amount signal is positive, while the change will be a convergence change when the shift amount signal is negative. Conversely, if the variation value is a negative value, the change will be a convergence change when the shift amount signal is positive, while the change will be a diffusion change when the shift amount signal is negative. The adjustment value may be fixed to zero in convergence changes. Namely, it is possible that the subtraction processing stated above is not performed in convergence changes and is performed only in diffusion changes.

For example, in a diffusion change, the adjustment value to be subtracted from the integrated value may be set to a value obtained by multiplying an adjustment value specified in the table by a factor of more than 1. In a convergence change, on the other hand, the adjustment value to be subtracted from the integrated value may be set to a value obtained by multiplying an adjustment value specified in the table by a factor of less than 1. Also, two types of the aforementioned tables may be prepared for diffusion changes and convergence changes.

FIG. 16 is a diagram that shows an example of a table 312 according to the example 1 of the embodiment 5. In the table 312, thresholds are provided in stages within the range of −36 to 36 in increments of 4 in between. In relation to the thresholds, adjustment values are provided in stages within the range of −9 to 9 in increments of 1 in between. These multiple thresholds and multiple adjustment values are provided on the positive and negative sides symmetrically.

For example, when the variation value is −34, since it exceeds the threshold (−32) but does not exceed the threshold (−36) in the direction in which the absolute value increases, the adjustment value is set to −8. When the variation value shows a diffusion change, the control unit 31 may set the adjustment value to be subtracted from the integrated value to a value obtained by multiplying −8 by a factor of 1.2, i.e., −9.6.

FIG. 17 is a diagram in which integrated values before and after the correction processing is performed are compared to each other in the example 1 of the embodiment 5. In FIG. 17, the line connecting diamonds shows the transition of the integrated value before the correction processing is performed, while the line connecting squares shows the transition of the integrated value after the correction processing is performed. Each of the diamond-shaped points and square points shows a sampling point of the integrated value. With reference to FIG. 17, it can be seen that the transition of the integrated value after the correction processing is performed converges toward zero when compared to the transition of the integrated value before the correction processing is performed. The predetermined time intervals, multiple thresholds, and multiple adjustment values mentioned above may be arbitrarily specified by the designer based on experimental results or simulation results.

As described above, according to the example 1 of the embodiment 5, variation in the integrated value, which is retained in the register within the integrating circuit 36, can be suppressed by subtracting from the integrated value an adjustment value, which is provided according to a variation of the integrated value to bring the variation closer to zero. If such processing is performed at the stage when the integrated value is small, oversensitive reaction of the lens can be suppressed, thereby improving the accuracy of the vibration correction function. Also, if the variation of the integrated value is larger, an adjustment value for adjusting the integrated value toward zero more greatly will be subtracted, so that variation in the integrated value can be suppressed without impairing the vibration correction function. Further, by using the table set forth above, the adjustment value can be flexibly set according to the magnitude of the variation value. For example, if the variation value is significantly large, setting may be provided so as to regard the angular velocity signal at the time as noise and negate the angular velocity signal.

Next, an example 2 of the embodiment 5 will be described. As with the correction processing in the example 1, the correction processing according to the example 2 is also preferably performed at the stage when the integrated value described previously is small. The control unit 31 acquires the integrated value retained in the register at predetermined time intervals and computes the variation value between the integrated value currently acquired and the integrated value previously acquired. The control unit 31 then subtracts, from the integrated value currently acquired, an adjustment value obtained by dividing the variation value by a predetermined value and re-sets the value retained in the register to the resulting value. For example, if the predetermined value is set to 4 when the variation value is 10, the adjustment value will be 2. Although the digits after the decimal point are discarded in this case, how to deal with such digits may be appropriately determined by the designer. When the integrated values before and after the correction processing is performed are compared to each other, the transition of the integrated value after the correction processing is performed converges toward zero, in the same way as shown in FIG. 17.

If the change from the integrated value previously acquired to the integrated value currently acquired is a diffusion change in the direction away from zero, the predetermined value mentioned above may be set to a value smaller than that set in the case of a convergence change in the direction toward zero. For instance, the predetermined value may be set to 3 in diffusion changes and to 4 in convergence changes. Also, the division processing and subtraction processing stated above may be set not to be performed in convergence changes. The predetermined time intervals and predetermined value mentioned above may be arbitrarily specified by the designer based on experimental results or simulation results.

Thus, the example 2 of the embodiment 5 provides the same effects as the example 1 except for the consideration regarding the table mentioned previously. In addition, when compared to the example 1, since the table is not used in the example 2, the configuration can be more simplified.

Further, an example 3 of the embodiment 5 will be described. Unlike the examples 1 and 2, the correction processing according to the example 3 can be performed during both the period in which the vibration correction function is performed and the period in which panning or tilting is performed.

The control unit 31 acquires the integrated value retained in the register at predetermined time intervals and computes the variation value between the integrated value currently acquired and the integrated value previously acquired. If the variation value is continuously a predetermined threshold or less for a predetermined time, the control unit 31 will subtract from the integrated value retained in the resister at the time when the predetermined time terminates, an adjustment value, which is provided to bring the integrated value close to zero, and will then re-set the value retained in the register to the resulting value. Since the variation value could be either positive or negative, a pair of values having the same absolute value are set on the positive and negative sides, respectively, as the thresholds mentioned above. More strictly, the variation value's being the threshold or less means that the variation value is the threshold or less with respect to the direction in which the absolute value increases. The adjustment value set forth above may be a fixed value. As with the thresholds above, a pair of values having the same absolute value are set on the positive and negative sides, respectively, as the adjustment values.

FIG. 18 is a diagram that shows the transition of the integrated value in the example 3 of the embodiment 5. FIG. 18 shows a state in which the angular velocity signal is not provided to the integrating circuit 36, i.e., a state in which an input value to be newly added is not input. In such a case, the aforementioned predetermined time for which the variation value is continuously the threshold or less will be continuously repeated. Accordingly, the adjustment value will be subtracted from the integrated value each time the predetermined time terminates. If the integrated value is positive, a positive fixed value will be subtracted therefrom, while, if the integrated value is negative, a negative fixed value will be subtracted therefrom.

The correction processing according to the example 3 of the embodiment 5 is preferably used in combination with the example 1 of the embodiment 5. It is preferable that the threshold of the example 3 is set to a threshold of which the absolute value is smallest among the multiple thresholds provided in stages in the example 1. In the example of FIG. 16, the thresholds of the example 3 are set to ±4. Accordingly, if the variation value is continuously the threshold or less for a predetermined time, ±1 will be subtracted from the integrated value retained in the resister at the time when the predetermined time terminates.

The correction processing according to the example 3 of the embodiment 5 may be applied when, in the embodiment 2 described previously, the control unit 31 decreases the integrated value retained in the register upon determining that it is the panning or tilting mode. The predetermined time intervals, predetermined thresholds, predetermined time, and adjustment values for bringing variations closer to zero mentioned above may be arbitrarily specified by the designer based on experimental results or simulation results.

As described above, according to the example 3 of the embodiment 5, an integrated value in the resister within the integrating circuit is gradually brought closer to zero in the situation where variation of the angular velocity signal is small or zero, so that the lens can be returned to the center position unbeknown to the user.

The present invention has been described with reference to the embodiments. The embodiments are intended to be illustrative only, and it will be obvious to those skilled in the art that various modifications to constituting elements or processes could be developed and that such modifications also fall within the scope of the present invention.

Although it is mentioned in the embodiments 1-5 that a gyro sensor, a Hall element, and a voice coil motor can be used for the vibration detection element 60, position detection element 80, and drive element 90, respectively, the present invention is not limited to such examples. For example, the vibration detection element 60 can be configured to detect vibration of the image pickup apparatus 500 based on an angular velocity signal, using a sensor for detecting angular velocity in the linear direction. For the drive element 90, a piezoelectric element, a stepping motor, or the like may be also used. Further, for the position detection element 80, an MR element, a photo screen diode, or the like may be also used.

Although the embodiments 1-5 employ the lens shift method of performing image stabilization processing by driving the lens, embodiments of the present invention are not limited thereto. For example, the present invention is also applicable to an image pickup element shift method of shifting the image pickup element 200 according to displacement of the image pickup apparatus 500. In this case, the position detection element 80 will detect the position of the image pickup element 200, and the drive element 90 can function as an element for driving the image pickup element 200.

In the embodiment 1, the control unit 31 provides control so as to enable the high-pass filter 34b when the amplitude value of the shift amount signal lies between the outer threshold and the inner threshold and to disable the high-pass filter 34b in the other situations. Alternatively, the high-pass filter 34 may be configured with such a digital filter as shown in FIG. 3 and controlled in the following way. The control unit 31 provides control so as to allow the digital filter to function as a high-pass filter when the amplitude value of the shift amount signal lies between the outer threshold and the inner threshold and to allow the digital filter to function as a low-pass filter in the other situations. The digital filter can be switched between a high-pass filter and a low-pass filter by changing the coefficients for the digital filter. Accordingly, since the digital filter can be used as a low-pass filter in the normal vibration correction mode, which is not to be shifted to the weak vibration correction mode, an angular velocity signal of which high-frequency noise has been removed can be input to the integrating circuit 36.

BRIEF DESCRIPTION OF THE DRAWINGS

FIG. 10 is a diagram that shows another example of an angular velocity signal output from the vibration detection element according to the example 1 of the embodiment 3;

FIGS. 11A and 11B is a diagram that shows a process and result of computation of an average value in each unit period based on an angular velocity signal shown in FIG. 10;

FIG. 16 is a diagram that shows an example of a table according to an example 1 of the embodiment 5;

Figure 1:
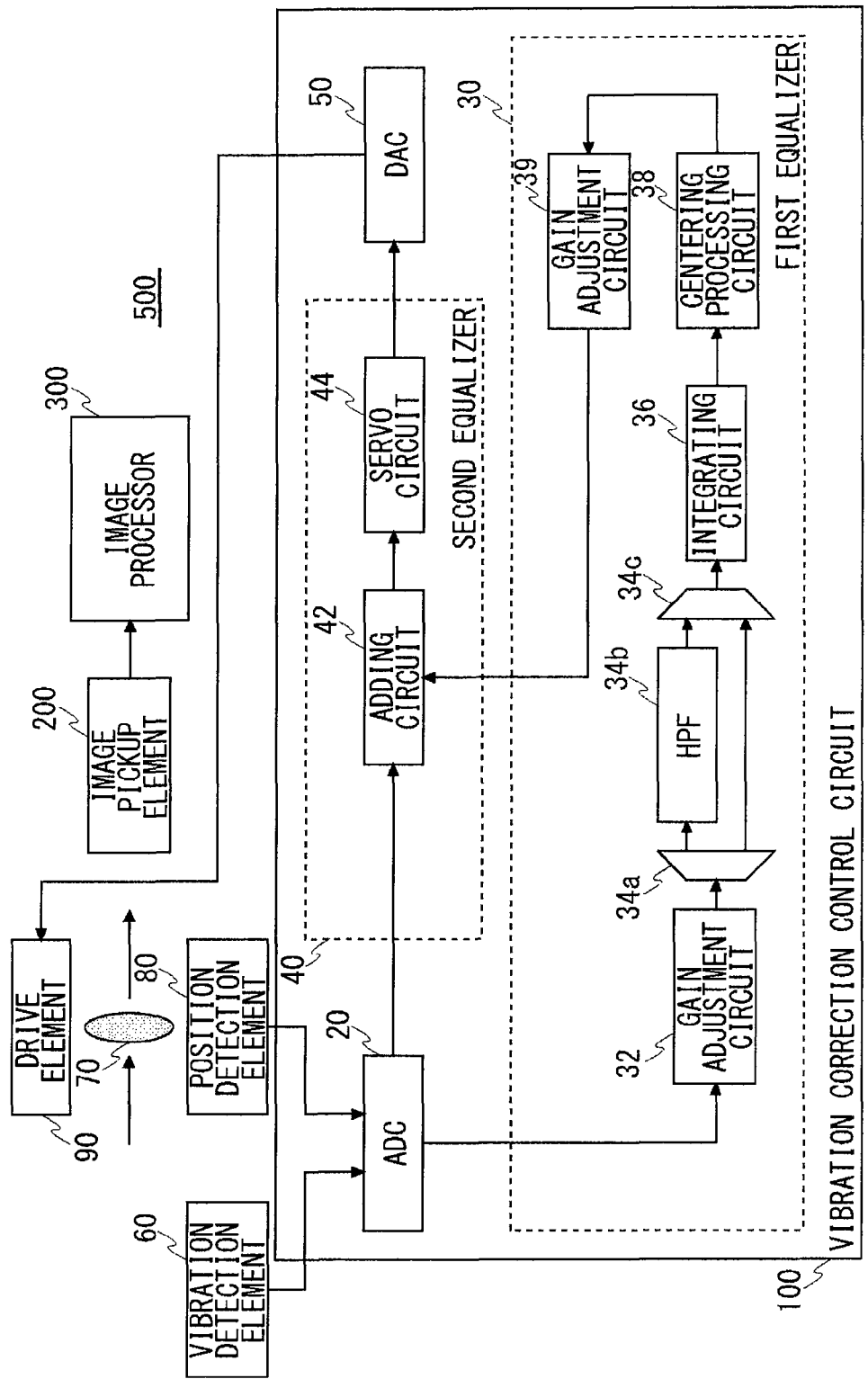
FIG. 1 is a block diagram that shows an overall configuration of an image pickup apparatus according to an embodiment of the present invention.
Figure 2:
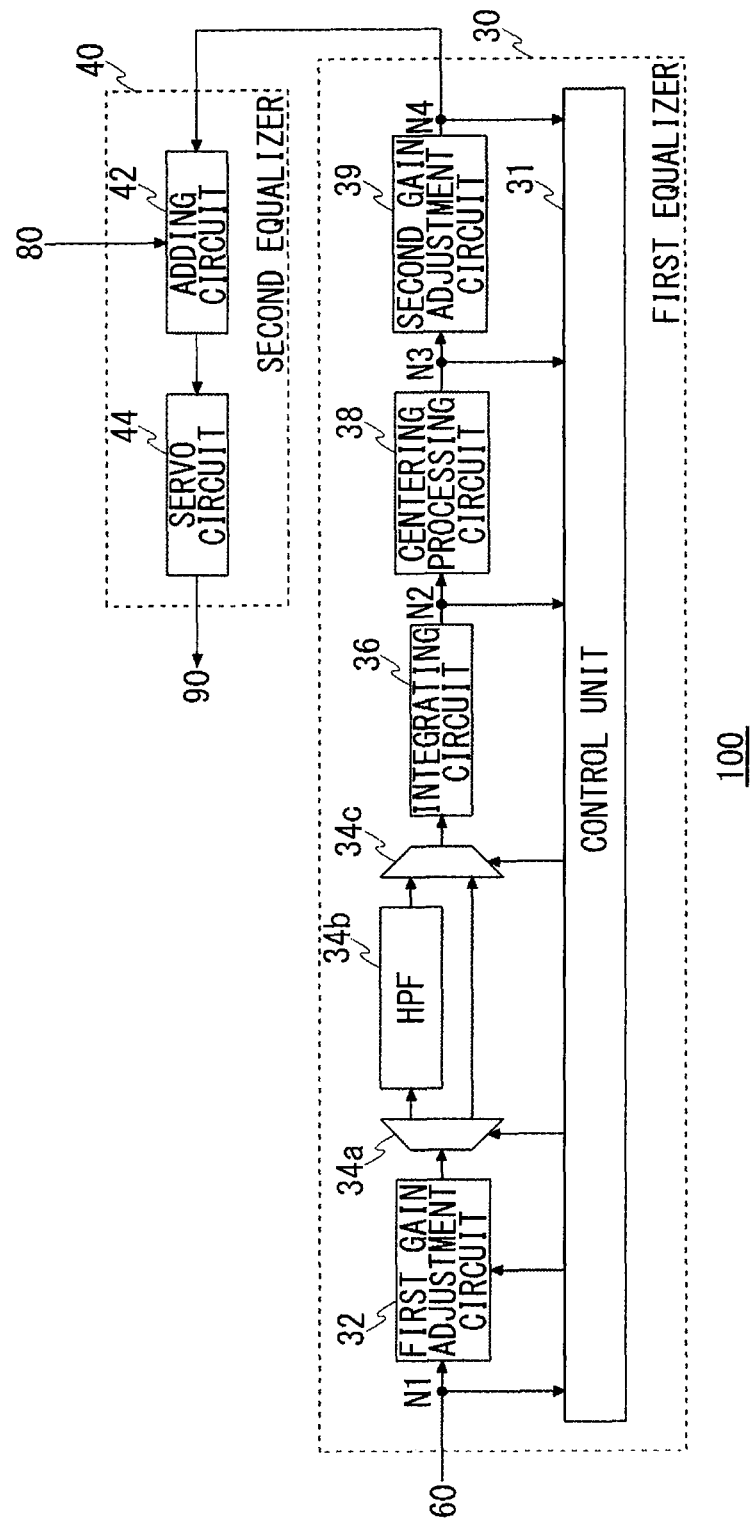
FIG. 2 is a configuration diagram for describing a vibration correction control circuit according to an embodiment 1.
Figure 3:
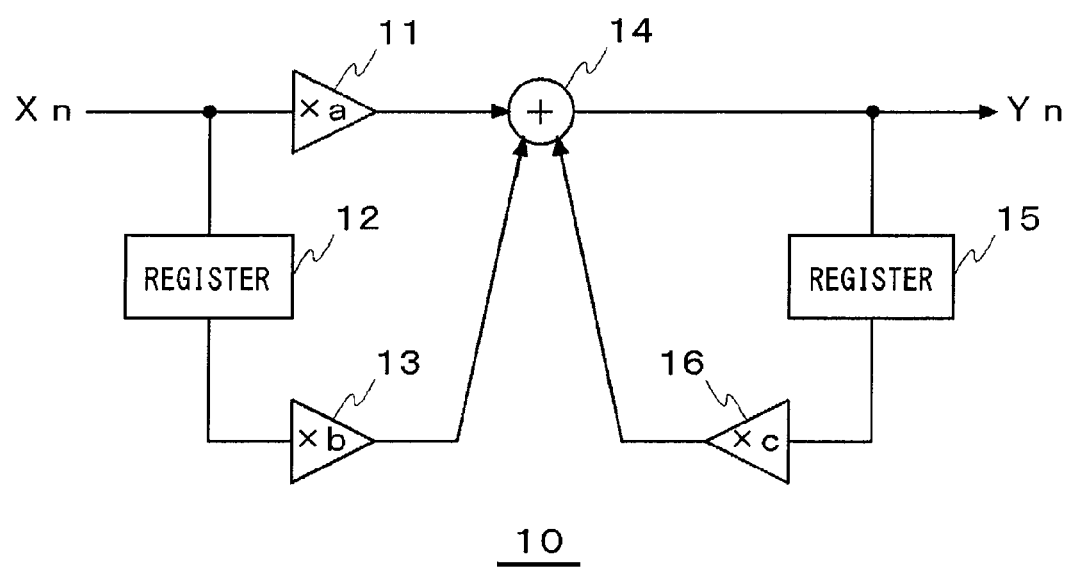
FIG. 3 is a circuit diagram that shows an example of a digital filter with which a high-pass filter, an integrating circuit, and a centering processing circuit can be configured.
Figure 4:
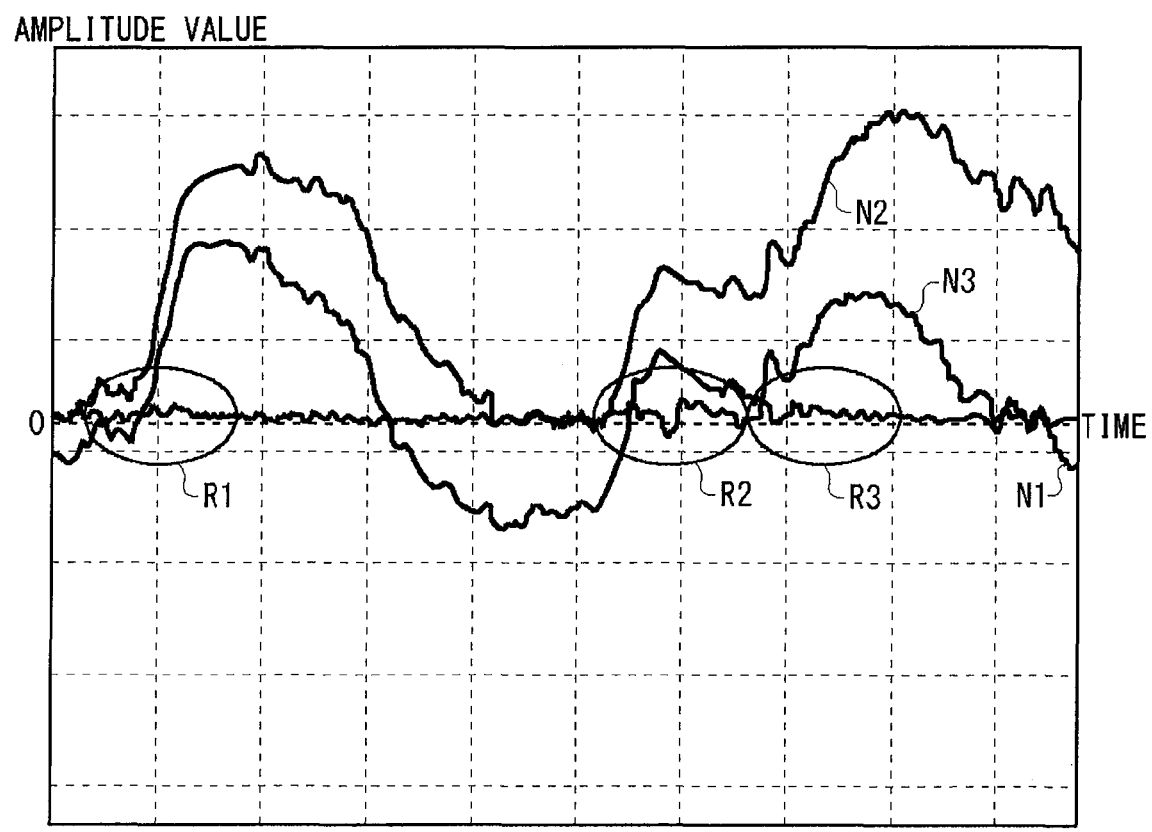
FIG. 4 is a diagram that shows examples of an angular velocity signal output from a vibration detection element, a shift amount signal output from the integrating circuit, and a shift amount signal output from the centering processing circuit.
Figure 5:
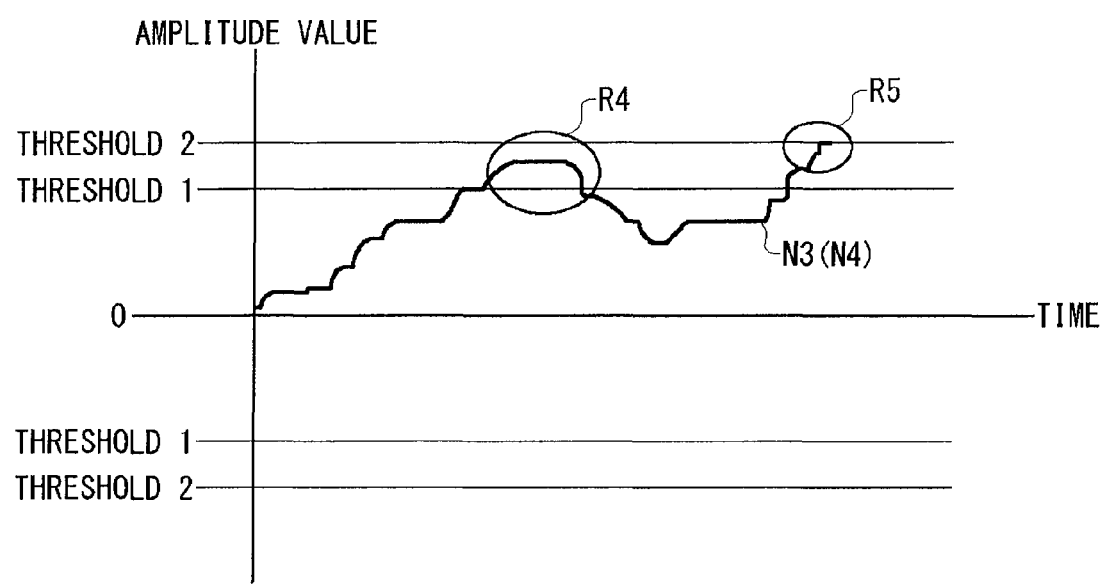
FIG. 5 is a diagram that shows an example of a shift amount signal output from the centering processing circuit according to the embodiment 1.
Figure 6:
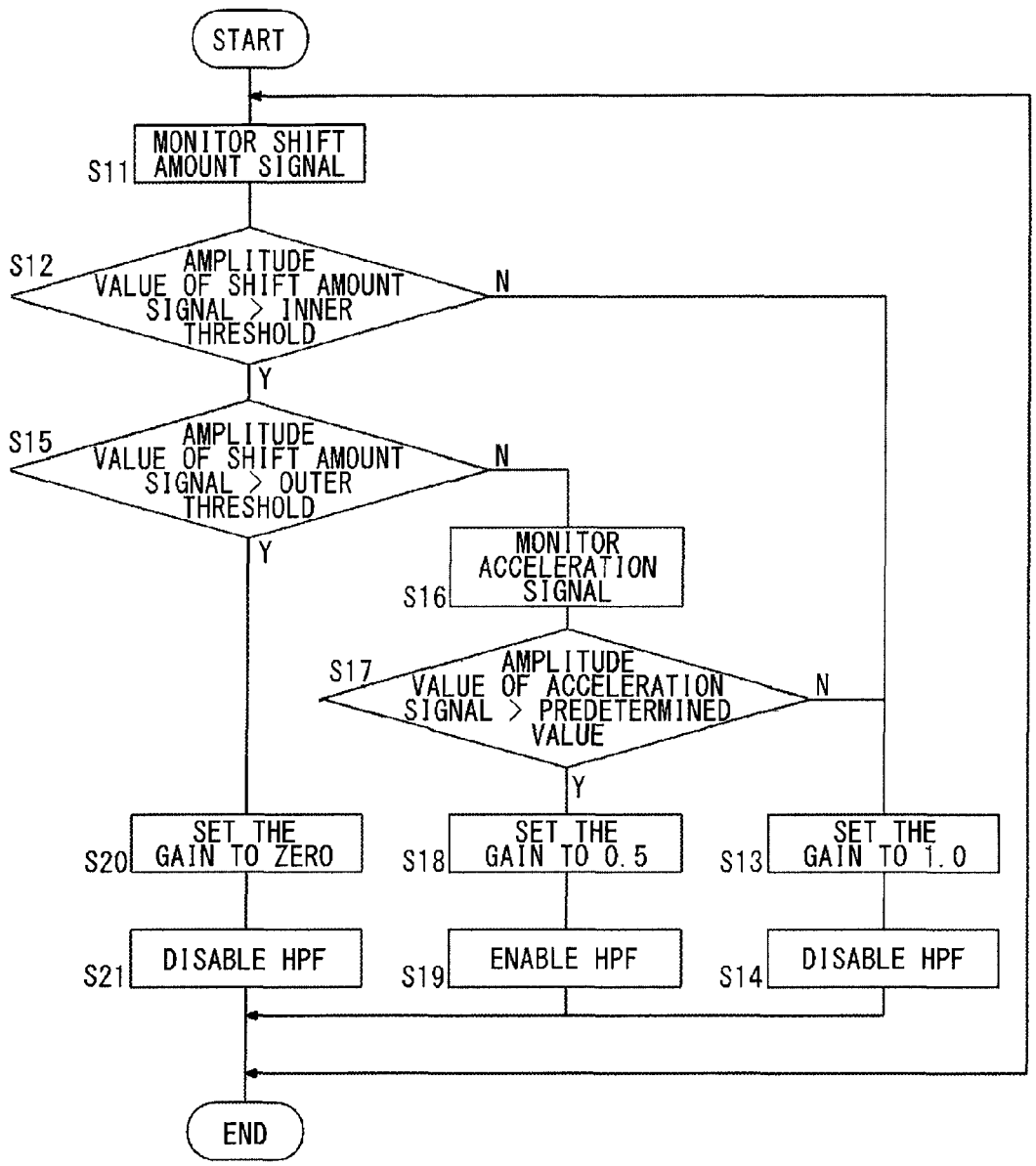
FIG. 6 is a flowchart of processing for determining if the image pickup apparatus has entered into the panning mode or tilting mode according to the embodiment 1.
Figure 7:
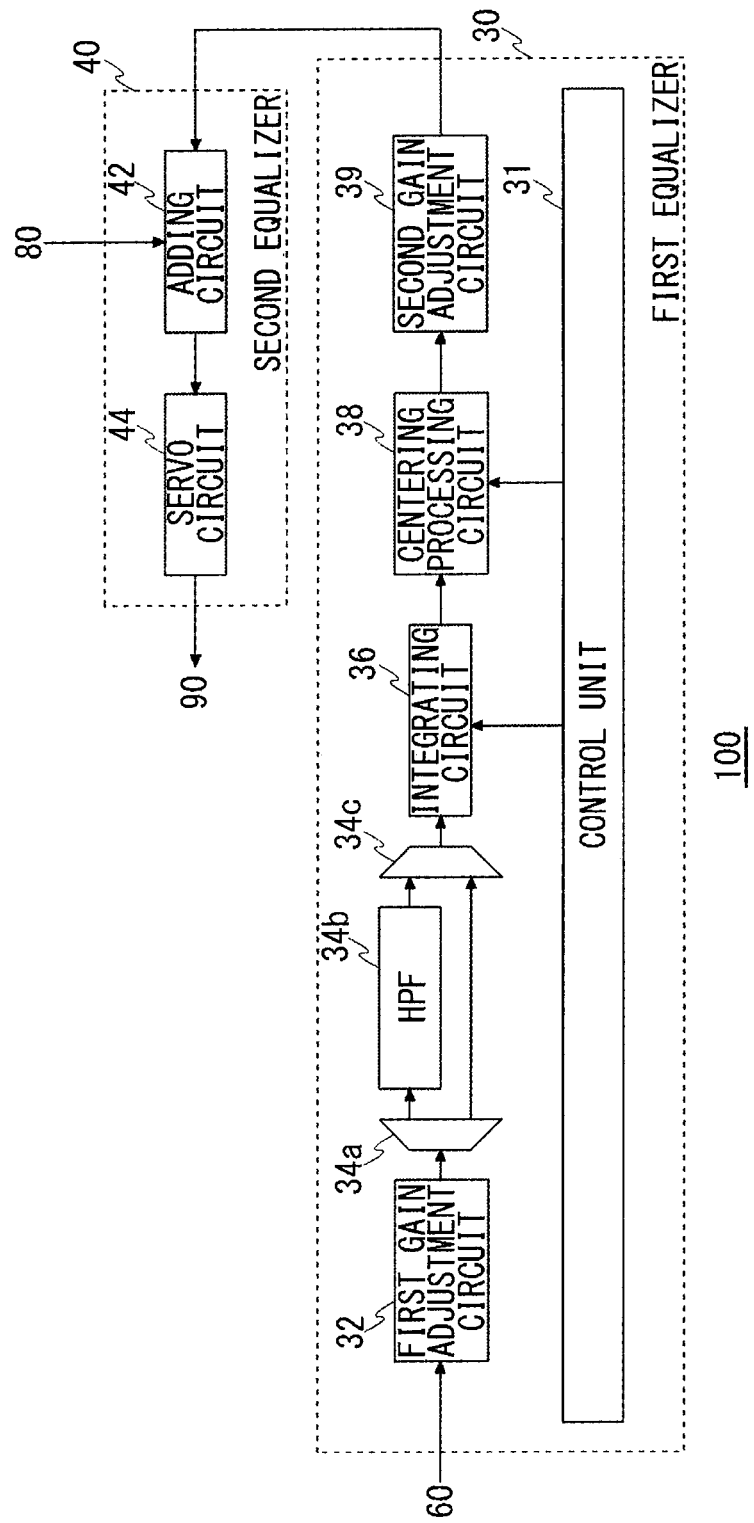
FIG. 7 is a configuration diagram for describing a vibration correction control circuit according to an embodiment 2.
Figure 8:
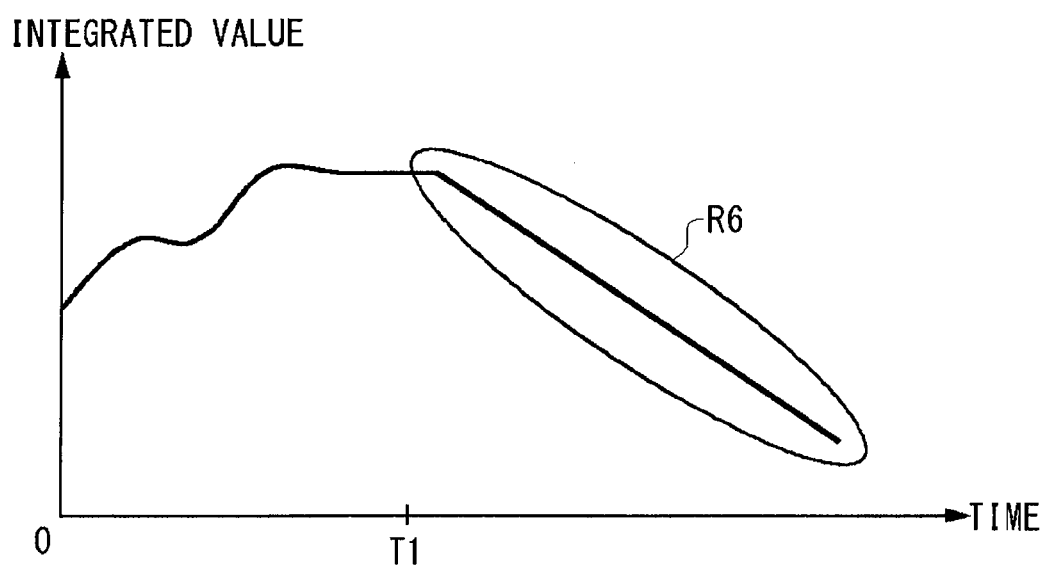
FIG. 8 is a diagram that shows the transition of an integrated value retained by a second register in the case where the integrating circuit is configured with the digital filter shown in FIG. 3.
Figure 9:
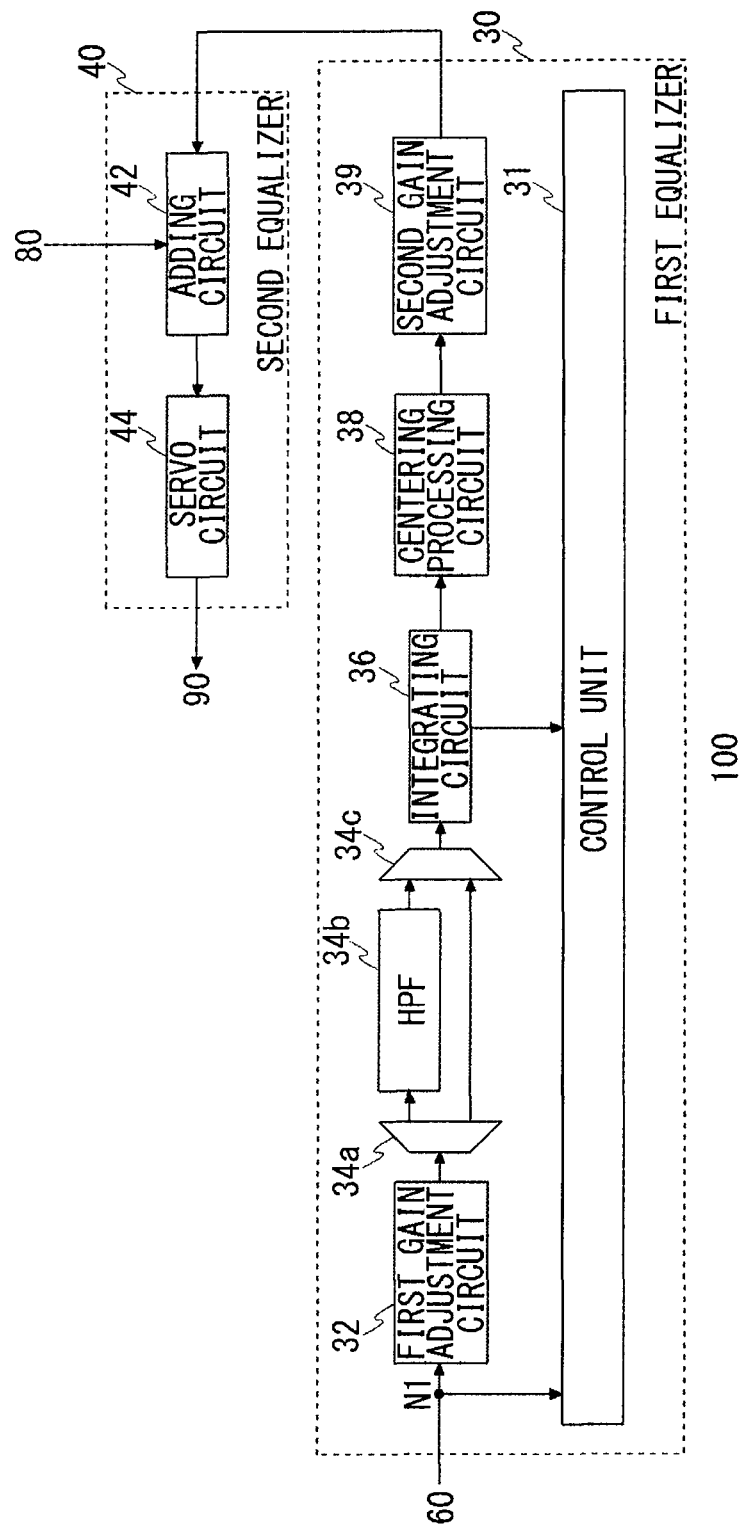
FIG. 9 is a configuration diagram for describing a vibration correction control circuit according to an example 1 of an embodiment 3.
Figure 12:
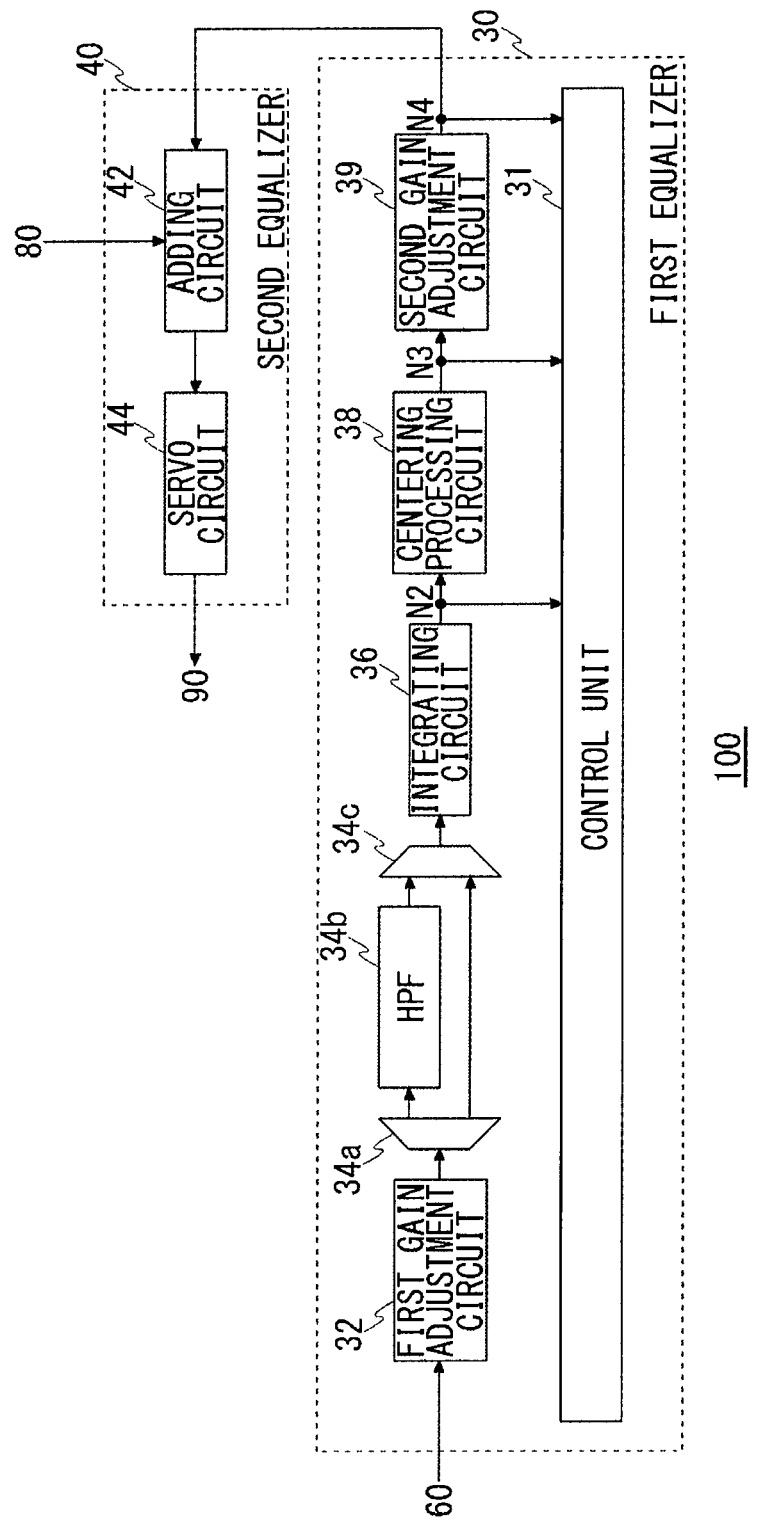
FIG. 12 is a configuration diagram for describing a vibration correction control circuit according to an example 2 of the embodiment 3.
Figure 13:
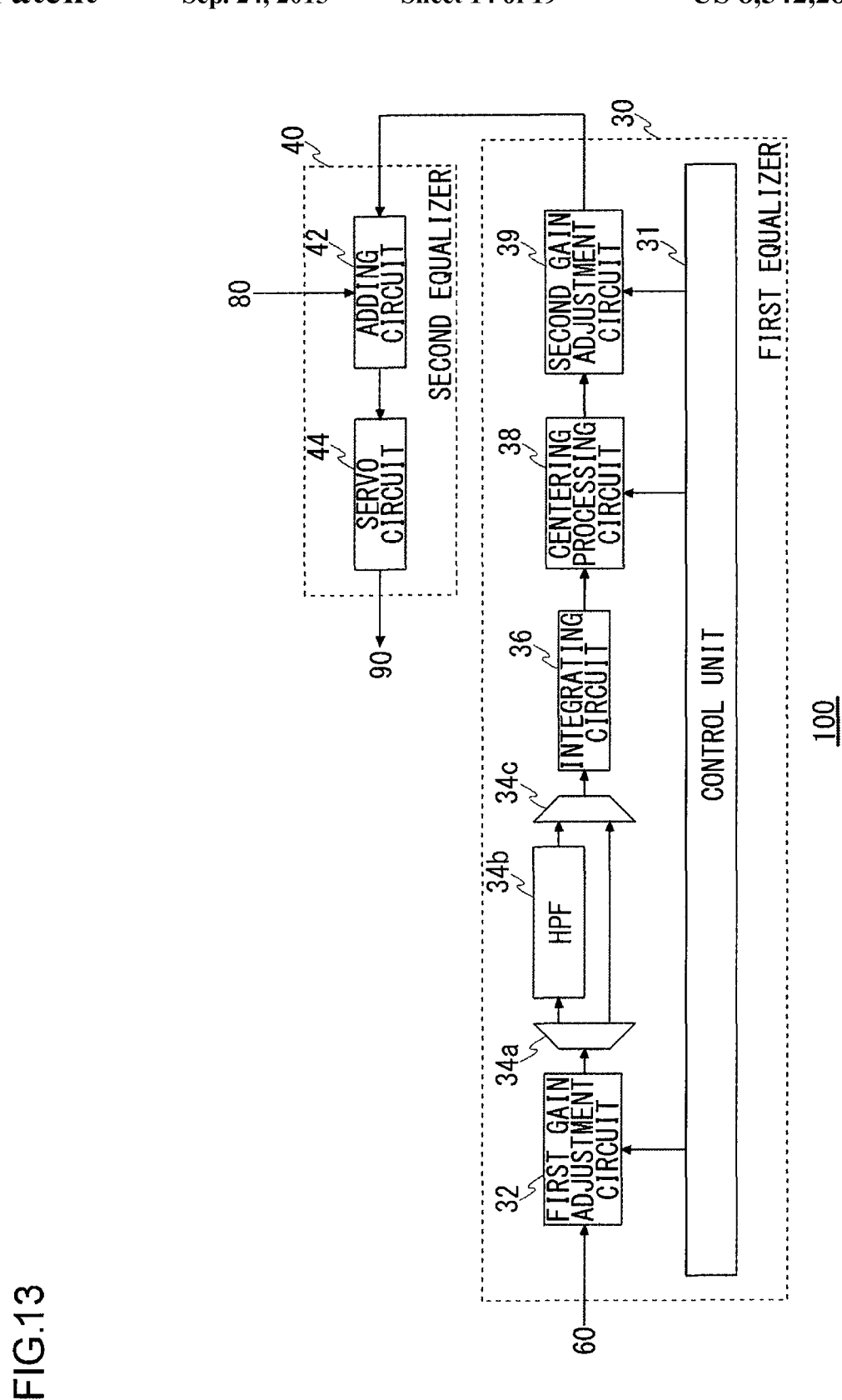
FIG. 13 is a configuration diagram for describing a vibration correction control circuit according to an embodiment 4.
Figure 14:
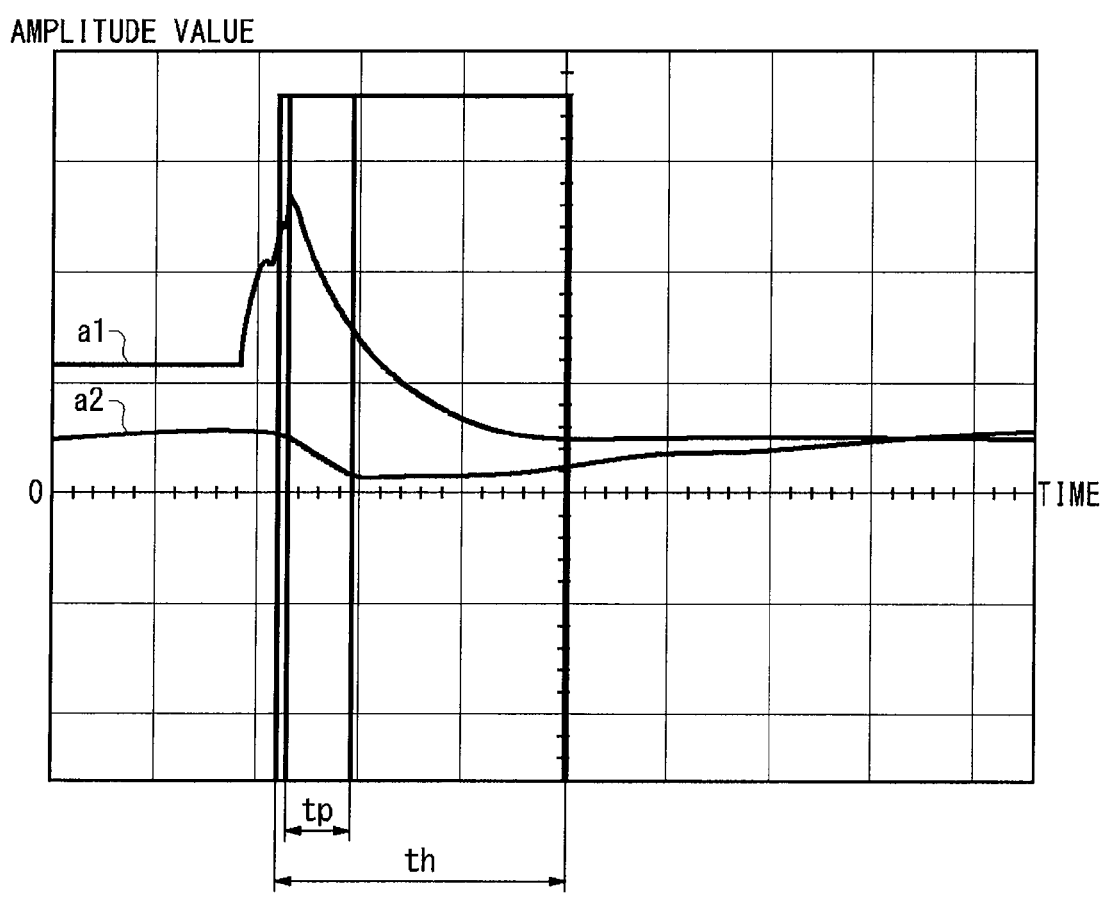
FIG. 14 shows examples of a waveform of a shift amount signal in the pan direction and a shift amount signal in the tilt direction.
Figure 15:
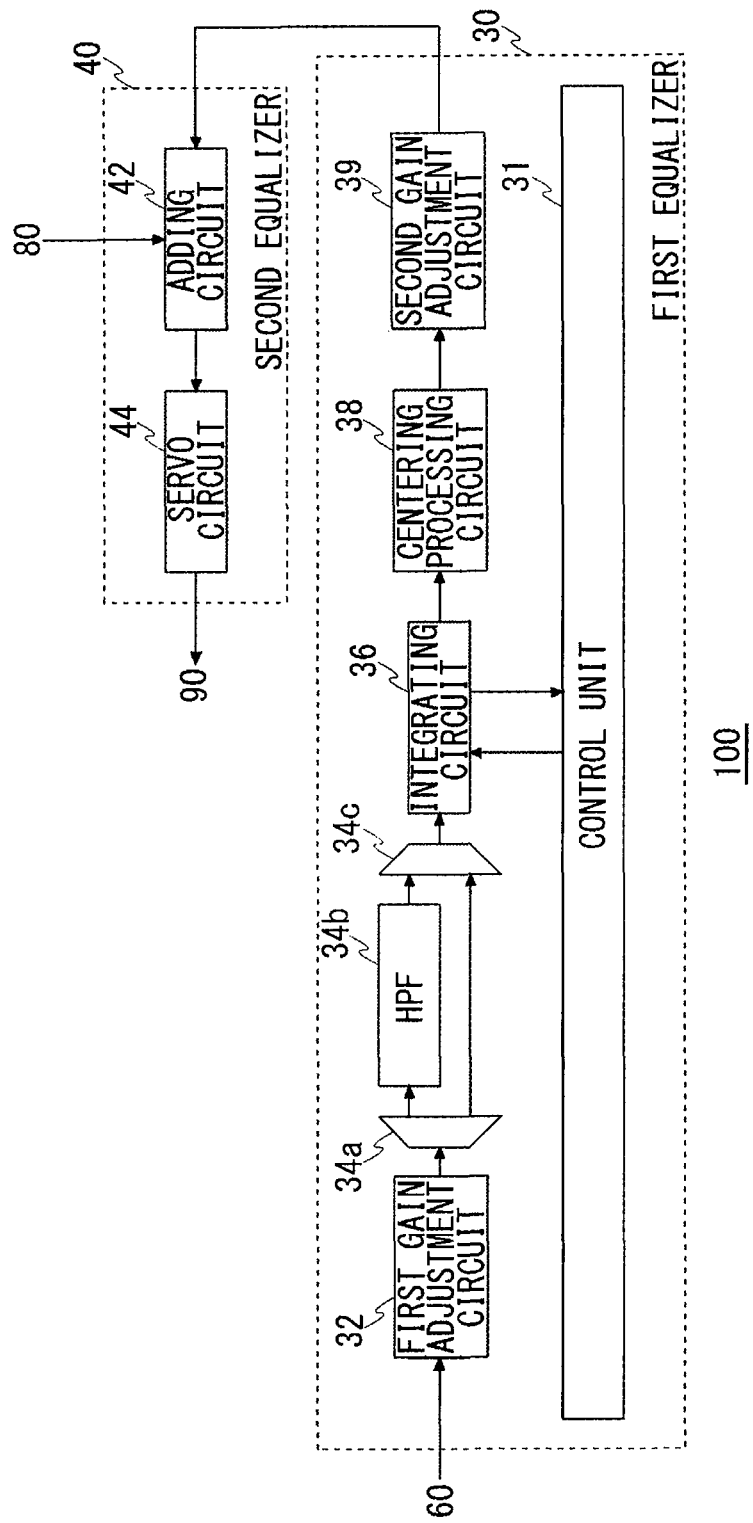
FIG. 15 is a configuration diagram for describing a vibration correction control circuit according to an embodiment 5.
Figure 17:
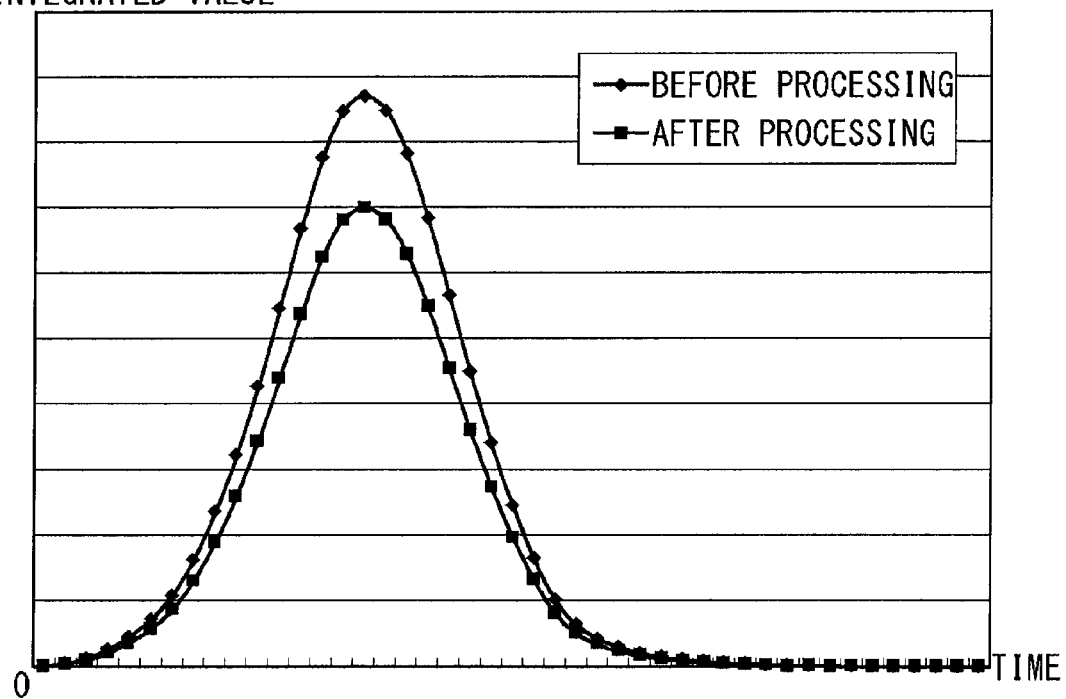
FIG. 17 is a diagram in which integrated values before and after correction processing is performed are compared to each other in the example 1 of the embodiment 5.
Figure 18:
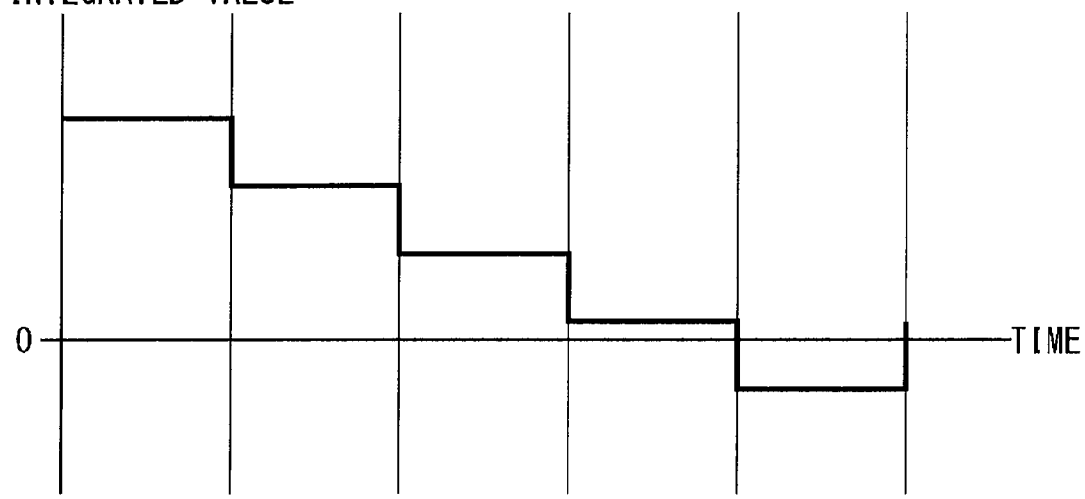
FIG. 18 is a diagram that shows the transition of an integrated value in an example 3 of the embodiment 5.

EXPLANATION OF REFERENCE NUMERALS 10 digital filter
11 first multiplier
12 first register
13 second multiplier
14 adder
15 second register
16 third multiplier
20 analog/digital conversion circuit
30 first equalizer
31 control unit
32 first gain adjustment circuit
34a first selector
34b high-pass filter
34c second selector
36 integrating circuit
38 centering processing circuit
39 second gain adjustment circuit
40 second equalizer
42 adding circuit
44 servo circuit
50 digital/analog conversion circuit
60 vibration detection element
70 lens
80 position detection element
90 drive element
100 vibration correction control circuit
200 image pickup element
300 image processor
500 image pickup apparatus

The invention claimed is:

1. A vibration correction control circuit for correcting displacement of an optical axis due to vibration applied to an image pickup apparatus, the circuit comprising:
   an integrating circuit configured to integrate an angular velocity signal output from a vibration detection element for detecting the vibration and generate a shift amount signal indicating a shift amount of the image pickup apparatus, the integrating circuit being configured with a digital filter which includes a register for retaining an integrated value to be set as the shift amount signal; and
   a control unit configured to control the integrating circuit, the control unit acquiring an integrated value retained in the register at predetermined time intervals and computing the variation value between the integrated value currently acquired and the integrated value previously acquired, and, if the variation value exceeds a predetermined threshold, subtracting from the integrated value currently acquired an adjustment value for bringing the variation value close to zero and re-setting the value retained in the register to the resulting value.

2. The vibration correction control circuit of claim 1, wherein the control unit refers to a table for relating a plurality of thresholds provided in stages to a plurality of adjustment values also provided in stages and proportional to the plurality of thresholds, so as to determine an adjustment value to be subtracted from the integrated value according to which threshold among the thresholds included in the table the variation value has exceeded.

3. The vibration correction control circuit of claim 1, wherein, if the change from the integrated value previously acquired to the integrated value currently acquired is a diffusion change in the direction away from zero, the control unit subtracts from the integrated value currently acquired an adjustment value for adjusting the integrated value toward zero more greatly than in the case of a convergence change in the direction toward zero.

4. A vibration correction control circuit for correcting displacement of an optical axis due to vibration applied to an image pickup apparatus, the circuit comprising:
   an integrating circuit configured to integrate an angular velocity signal output from a vibration detection element for detecting the vibration and generate a shift amount signal indicating a shift amount of the image pickup apparatus, the integrating circuit being configured with a digital filter which includes a register for retaining an integrated value to be set as the shift amount signal; and
   a control unit configured to control the integrating circuit, the control unit acquiring an integrated value retained in the register at predetermined time intervals, computing the variation value between the integrated value currently acquired and the integrated value previously acquired, subtracting from the integrated value currently acquired an adjustment value obtained by dividing the variation value by a predetermined value, and re-setting the value retained in the register to the resulting value.

5. The vibration correction control circuit of claim 4, wherein, if the change from the integrated value previously acquired to the integrated value currently acquired is a diffusion change in the direction away from zero, the predetermined value is set to a value smaller than that set in the case of a convergence change in the direction toward zero.

6. A vibration correction control circuit for correcting displacement of an optical axis due to vibration applied to an image pickup apparatus, the circuit comprising:
   an integrating circuit configured to integrate an angular velocity signal output from a vibration detection element for detecting the vibration and generate a shift amount signal indicating a shift amount of the image pickup apparatus, the integrating circuit being configured with a digital filter which includes a register for retaining an integrated value to be set as the shift amount signal; and
   a control unit configured to control the integrating circuit, the control unit acquiring an integrated value retained in the register at predetermined time intervals and computing the variation value between the integrated value currently acquired and the integrated value previously acquired, and, if the variation value is continuously a predetermined threshold or less for a predetermined time, subtracting from an integrated value retained in the resister at the time when the predetermined time terminates, an adjustment value for bringing the integrated value close to zero and re-setting the value retained in the register to the resulting value.

7. An image pickup apparatus, comprising:
   a lens;
   an image pickup element;
   a drive element configured to drive the lens or the image pickup element;
   a position detection element configured to detect the position of the lens or the image pickup element;
   a vibration detection element configured to detect vibration; and
   the vibration correction control circuit of claim 1, the vibration correction control circuit controlling the drive element to correct the position of the lens or the image pickup element, on the basis of a position signal output from the position detection element and the shift amount signal.

* * * * *